(12) United States Patent
Tobaly et al.

(10) Patent No.: US 11,582,372 B2
(45) Date of Patent: Feb. 14, 2023

(54) SYSTEM AND METHOD FOR LENS ALIGNMENT AND BONDING

(71) Applicant: Adasky, Ltd., Yokneam Illit (IL)

(72) Inventors: Daniel Tobaly, Haifa (IL); Nir Levi, Pardes Hanna-Karkur (IL); Eyal Yavets, Haifa (IL); Vitaly Kuperman, Maalot (IL)

(73) Assignee: Adasky, Ltd., Yokneam Illit (IL)

( * ) Notice: Subject to any disclaimer, the term of this patent is extended or adjusted under 35 U.S.C. 154(b) by 53 days.

(21) Appl. No.: 17/384,477

(22) Filed: Jul. 23, 2021

(65) Prior Publication Data
US 2022/0006931 A1    Jan. 6, 2022

Related U.S. Application Data

(63) Continuation-in-part of application No. 17/323,414, filed on May 18, 2021, now Pat. No. 11,252,316, which is a continuation of application No. 16/699,894, filed on Dec. 2, 2019, now Pat. No. 11,025,807, application No. 17/384,477, which is a continuation-in-part of application No. 17/154,695, filed on Jan. 21, 2021, now Pat. No. 11,356,585, which is a continuation-in-part of application No. 16/699,894, filed on Dec. 2, 2019, now Pat. No. 11,025,807.

(Continued)

(51) Int. Cl.
*H04N 5/225* (2006.01)
*H04N 5/33* (2023.01)

(52) U.S. Cl.
CPC ......... *H04N 5/2254* (2013.01); *H04N 5/2257* (2013.01); *H04N 5/33* (2013.01)

(58) Field of Classification Search
CPC ...... H04N 5/2254; H04N 5/2257; H04N 5/33; H04N 17/002; H04N 5/2253
See application file for complete search history.

(56) References Cited

U.S. PATENT DOCUMENTS 8,542,451 B2   9/2013 Lu et al.
9,277,104 B2   3/2016 Sesti et al.
(Continued)

FOREIGN PATENT DOCUMENTS

JP    2010134377 A    6/2010
JP    2016092761 A    5/2016
WO    2017139825 A1   8/2017

OTHER PUBLICATIONS

International Search Report and Written Opinion of International Searching Authority for PCT/IB2020/061329, ISA/IL, Jerusalem, Israel, dated Feb. 17, 2021.

(Continued)

*Primary Examiner* — Yogesh K Aggarwal
(74) *Attorney, Agent, or Firm* — M&B IP Analysts, LLC

(57) ABSTRACT

A system for securing an infrared camera lens in optical alignment with an infrared camera sensor, including: a computer-controlled robotic arm configured to adjust a relative position of the infrared camera sensor and the infrared camera lens so as to bring the infrared camera lens into an ideal lens position with respect to the infrared camera sensor; and at least one computer-controlled welder, the at least one computer-controlled welder being configured to perform welding together of at least two parts of the infrared camera after the infrared camera lens is positioned by the robotic arm in the ideal lens position with respect to the infrared sensor camera such that the infrared camera lens is permanently maintained in the ideal lens position.

29 Claims, 48 Drawing Sheets

Related U.S. Application Data

(60) Provisional application No. 63/156,611, filed on Mar. 4, 2021.

(56) References Cited

U.S. PATENT DOCUMENTS

| | | |
|---|---|---|
| 9,338,334 B2 | 5/2016 | Lu et al. |
| 2007/0279619 A1 | 12/2007 | Chang |
| 2010/0010504 A1 | 1/2010 | Simaan et al. |
| 2010/0103308 A1 | 4/2010 | Butterfield et al. |
| 2012/0019940 A1 | 1/2012 | Lu et al. |
| 2012/0219257 A1* | 8/2012 | Meadowcroft .... G02B 6/12004 29/832 |
| 2014/0298642 A1 | 10/2014 | Sesti et al. |
| 2015/0256726 A1 | 9/2015 | Kaioka et al. |
| 2016/0367208 A1* | 12/2016 | Liu .................... A61B 6/4417 |
| 2018/0361590 A1 | 12/2018 | Ting et al. |
| 2019/0052779 A1 | 2/2019 | Taylor et al. |
| 2019/0336093 A1 | 11/2019 | Parrini et al. |
| 2020/0024853 A1 | 1/2020 | Furrer et al. |
| 2021/0168266 A1 | 6/2021 | Kuperman et al. |

OTHER PUBLICATIONS

International Search Report and Written Opinion of International Searching Authority for PCT/IB2021/057382, ISA/IL, Jerusalem, Israel dated Oct. 28, 2021.

* cited by examiner

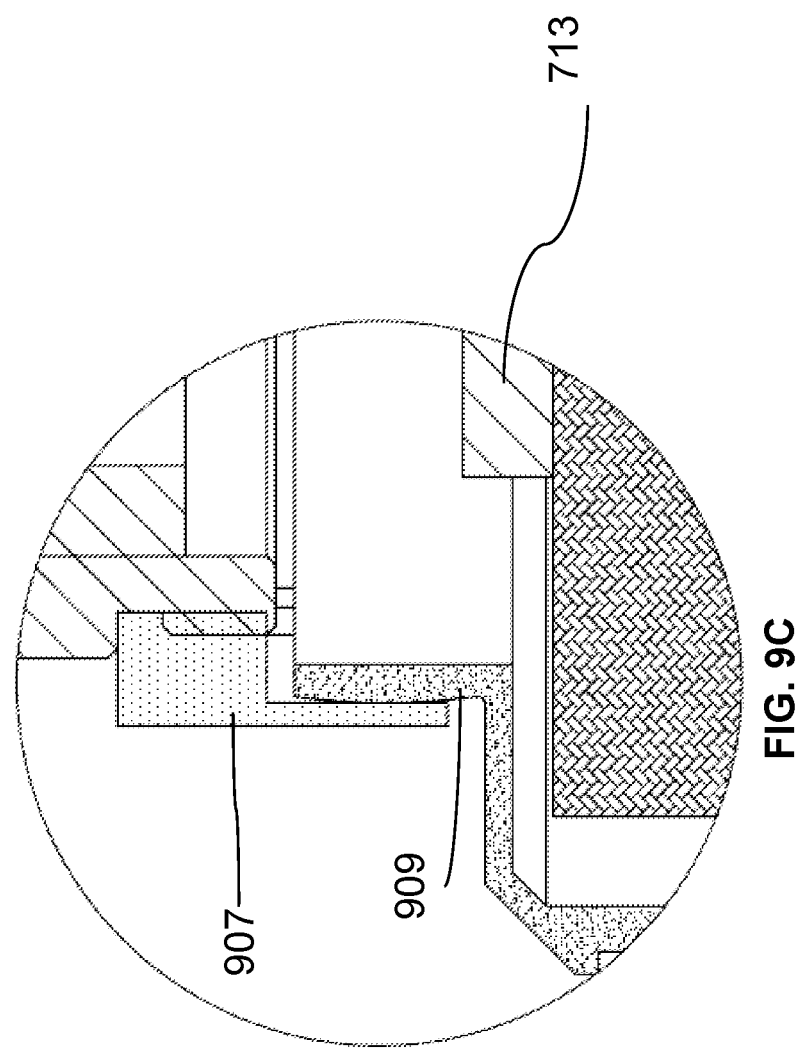

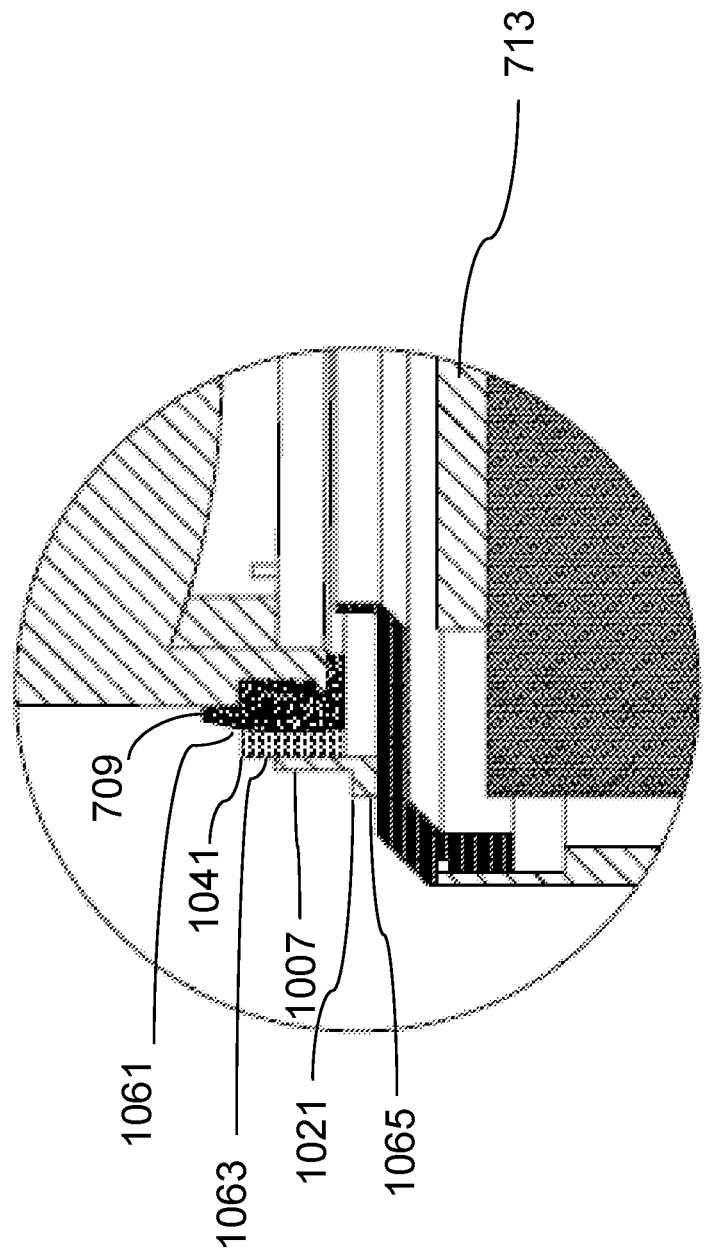

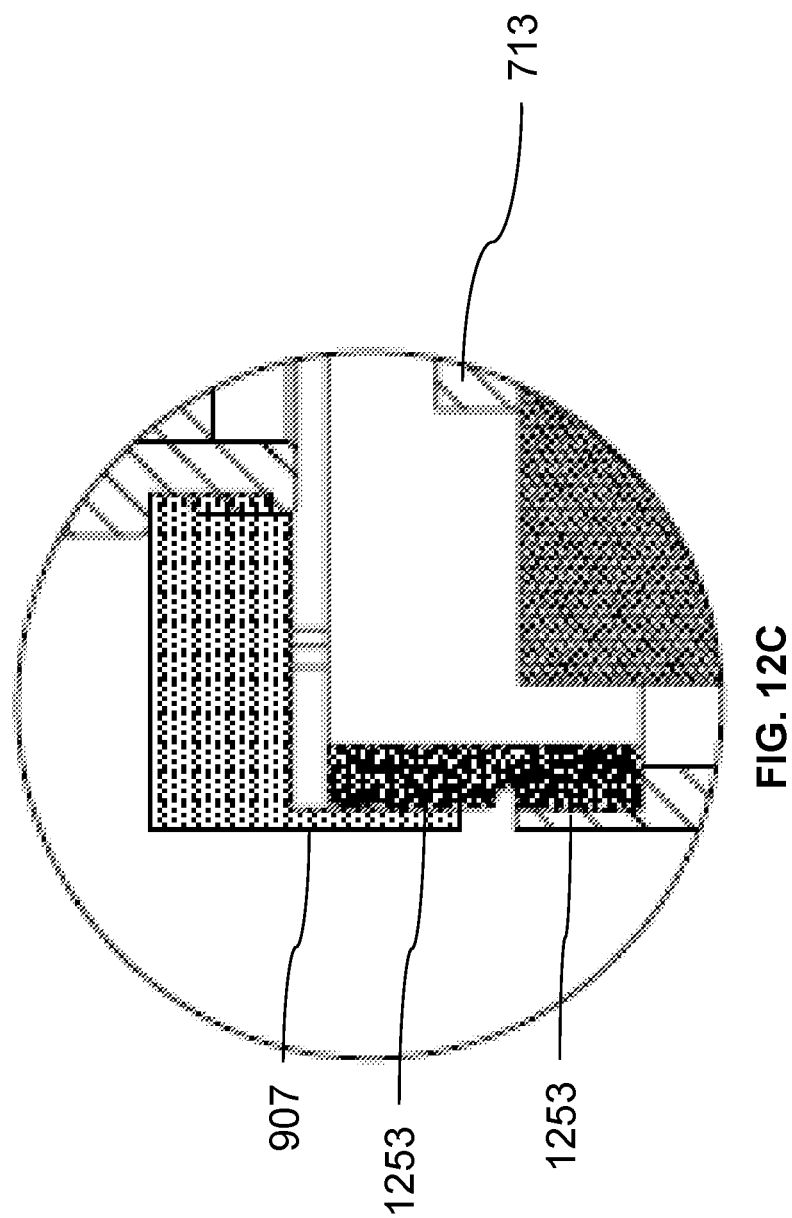

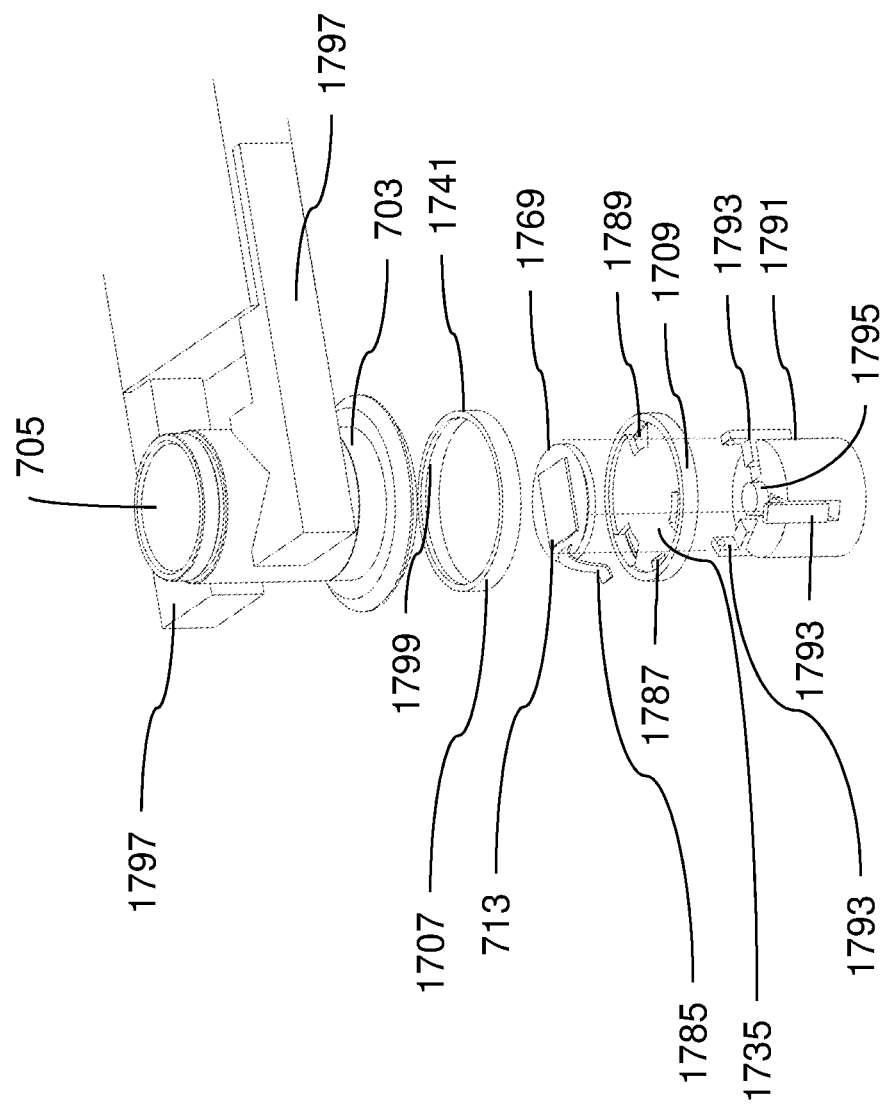

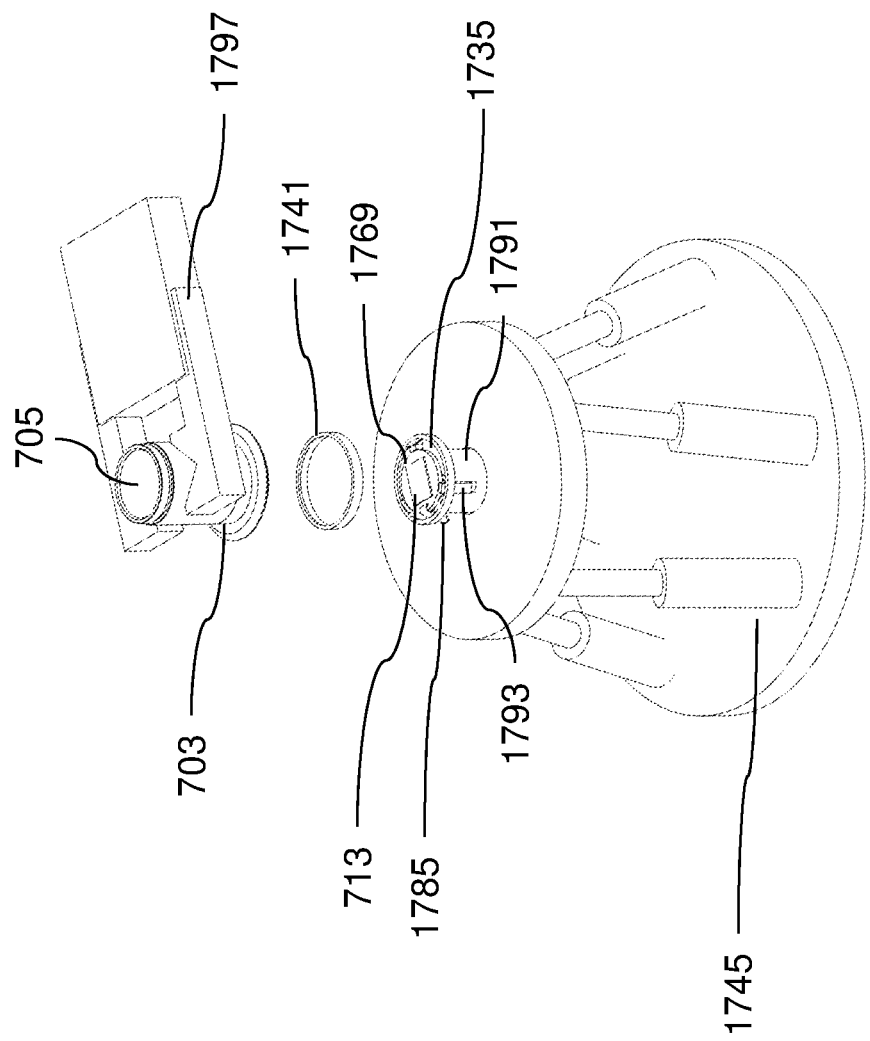

SYSTEM AND METHOD FOR LENS ALIGNMENT AND BONDING

CROSS REFERENCE TO RELATED APPLICATIONS

This application claims the benefit of U.S. provisional application No. 63/156,611 filed on Mar. 4, 2021. This application also claims benefit, as a continuation-in-part of U.S. application Ser. No. 17/323,414 filed on May 18, 2021, which in turn is a continuation of U.S. application Ser. No. 16/699,894 filed on Dec. 2, 2019, now U.S. Pat. No. 11,025,807. This application further claims benefit as a continuation-in-part of U.S. application Ser. No. 17/154,695 filed on Jan. 21, 2021, which is a continuation-in-part of U.S. application Ser. No. 16/699,894 filed on Dec. 2, 2019, now U.S. Pat. No. 11,025,807. The contents of all of the foregoing applications are hereby incorporated by reference.

TECHNICAL FIELD

The present disclosure relates generally to camera lens calibration, and more specifically to the initial alignment and calibration of infrared camera lenses.

BACKGROUND

As sensor-based technology has improved dramatically in recent years, new uses for sensors have become possible. In particular, cameras have become widely utilized for various applications, including advanced driver assistance systems (ADAS) and autonomous vehicle systems. One type of camera that may be utilized in these applications is a thermal infrared camera. The infrared spectrum lies outside of the visible light range and consists of a near infrared section (NIR) with wavelengths of 0.75-1 micrometers ($\mu m$); a short wavelength infrared section (SWIR) with wavelengths of 1-3 $\mu m$; a medium wavelength infrared section (MWIR) with wavelengths of 3-5 $\mu m$; and a long wavelength infrared section (LWIR) with wavelengths of 8-14 $\mu m$. Many thermal infrared (IR) cameras operate within the LWIR section to detect infrared energy that is guided to an IR sensor through the camera's lens. These IR cameras can be utilized for a variety of imaging applications including, but not limited to, passive motion detection, night vision, thermal mapping, health care, building inspection, surveillance, ADAS, and the like.

During the manufacture of an infrared camera, a lens should be attached to the camera body, namely the element of the camera housing an infrared image sensor. This attachment should be performed to exacting standards, as the lens must not only be placed at an ideal distance from the sensor, but in an ideal plane, since any minor shift or skewed positioning will result in subpar or out of focus images. Therefore, the lens should be secured to the camera body with optimal positioning along the six degrees of freedom. Attaching a lens in such a precise manner manually is not only ineffective, but difficult to replicate on a consistent basis, let alone accomplish in an efficient manner. Further, even though robotic arms may be used to execute the attachment and reliably repeat the same movements from camera to camera, each lens and sensor may vary ever so slightly, requiring a unique and individualized attachment for each pairing of a sensor and a lens, proving a difficult task for a generic robot.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a system for securing an infrared camera lens in optical alignment with an infrared camera sensor, including: a computer-controlled robotic arm configured to adjust a relative position of the infrared camera sensor and the infrared camera lens so as to bring the infrared camera lens into an ideal lens position with respect to the infrared camera sensor; and at least one computer-controlled welder, the at least one computer-controlled welder being configured to perform welding together of at least two parts of the infrared camera after the infrared camera lens is positioned by the robotic arm in the ideal lens position with respect to the infrared camera sensor such that the infrared camera lens is permanently maintained in the ideal lens position.

Certain embodiments disclosed herein also include a method for securing an infrared camera lens in optical alignment with an infrared camera sensor, including: adjusting a relative position of the infrared camera sensor and the infrared camera lens such that the infrared camera lens is in an ideal lens position with respect to the infrared camera sensor; and performing welding, by at least one computer-controlled welder, such that the infrared camera lens is permanently maintained in the ideal lens position with respect to the infrared camera sensor.

Certain embodiments disclosed herein also include a method for securing a camera lens in optical alignment with a camera sensor, including: adjusting a relative position of the camera sensor and the camera lens such that the camera lens is in an ideal lens position with respect to the camera sensor; and performing welding, by at least one computer-controlled welder, such that the camera lens is permanently maintained in the ideal lens position with respect to the camera sensor.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 9A-9D shows various views of an illustrative arrangement of an infrared camera having a lens body inserted into a camera body such that they may be permanently joined together in a fixed relationship using welding.

FIGS. 10A-10D shows various views of an illustrative arrangement of an infrared camera having a lens body inserted into a camera body such that they may be permanently joined together in a fixed relationship using welding.

FIGS. 12A-12D shows various views of an illustrative arrangement of an infrared camera having a lens body inserted into a camera body such that they may be permanently joined together in a fixed relationship using welding.

FIGS. 17A-17F shows various views of an illustrative arrangement of portions of an infrared camera and manipulators by which the sensor is manipulated so as to position the lens of the camera in the ideal lens position and so that the sensor may then be permanently fixed into position using welding.

DETAILED DESCRIPTION

Figure 1:
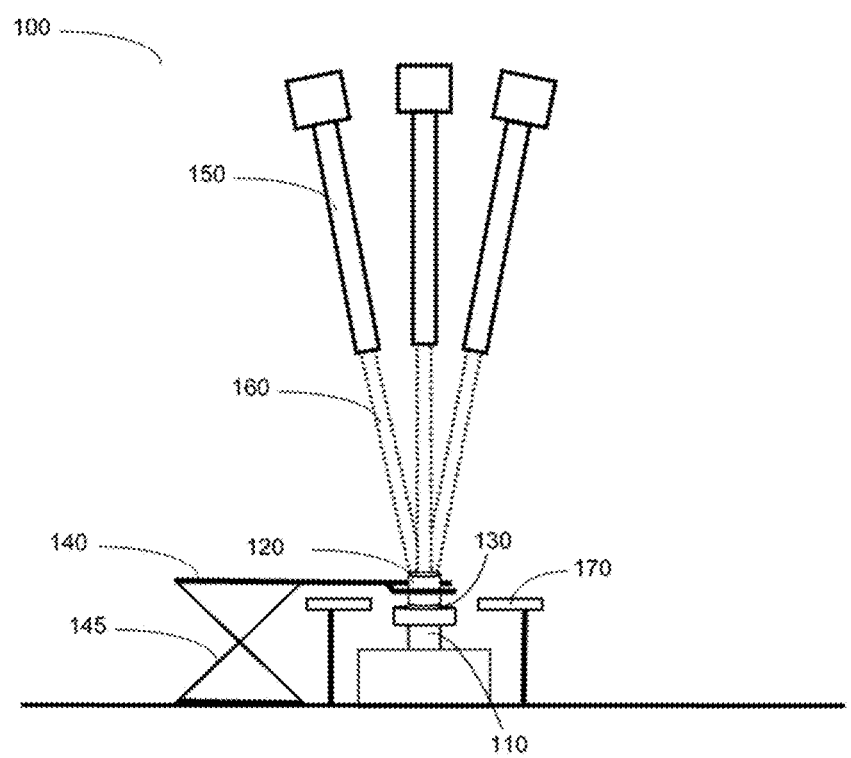
FIG. 1 is a schematic diagram of a system for optical alignment and calibration of an infrared camera lens according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to substantially like parts through several views.

The terms glue and adhesive are used interchangeably herein.

FIG. 1 is a schematic diagram of a system 100 for optical alignment and calibration of an infrared camera lens 120 according to an embodiment. The system 100 includes one or more collimators 150 placed directly above a lens 120, such as an infrared lens, to be used for lens calibration. A lens support mechanism of the system 100 includes a robotic arm 140 configured to hold the lens 120 and manipulate its position relative to a camera body 110. In an embodiment, the robotic arm 140 is supported by a hexapod platform 145. In an example embodiment, the platform 145 is configured to move the robotic arm 140, and the lens attached thereto 120, in a predefined number (e.g., 6) degrees of freedom. In a further embodiment, the hexapod platform 145 is a Steward platform with a high-resolution kinematic system employing three pairs of hydraulic, pneumatic, or electromechanical actuators configured to adjust the x, y, and z axes along with the pitch, roll, and yaw. This allows for precise adjustments to the positioning of the robotic arm 140 attached thereto and thus to the lens 120. In an embodiment, the hexapod is controlled by software executing on a computer, or hardware, that is configured to adjust the hexapod according to readings from the collimators 150, as discussed further below. In such an embodiment, the hexapod, and hence the robot arm, are computer controlled.

The software is stored in a machine-readable media and shall be construed broadly to mean any type of instructions, whether referred to as software, firmware, middleware, microcode, hardware description language, or otherwise. Instructions may include code (e.g., in source code format, binary code format, executable code format, or any other suitable format of code).

The collimators 150 are optical instruments including a well corrected objective lens with an illuminated calibration target at its focal plane. The emerging beam is a parallel, or collimated, beam, so that the image of the calibration target is projected at infinity. In an embodiment, there are five collimators 150 positioned above the lens 120 and the camera body 110 and are configured to output a calibration target projection. The collimators 150 are positioned such that the output calibration target projection converges on the infrared sensor within the camera body 110, through the lens 120. The angled arrangement of the collimators is designed to define the whole area of an image sensor according to the camera's apparent field of view (FOV). In an embodiment, a shutter mechanism (not shown) is placed between the lens 120 and the collimators 150, such that the shutter can be opened and closed as the position of the lens 120 is adjusted, to provide an efficient manner of calibrating the lens between various positions.

Each collimator 150 includes three main parts: a black body, a target, and a collimating lens system. The parts of the collimator 150 are disposed within a structure of the collimator and are not shown in FIG. 1. In an embodiment, the black body is an electrically controlled device that is used as a highly thermally stable background radiation source for the target. In an embodiment, it provides a difference of 10 degrees relative to a room ambient temperature. The camera sensor is positioned toward the black body, such that when the lens 120 is in place, the image produced by the sensor contains a calibration target with a background of the black body. When in a properly calibrated position, the projection of the calibration targets converge on the infrared sensor of the camera 110 such that when the lens 120 is in place, the MTF values are optimized for all of the calibration targets. The system 100 may include multiple black bodies positioned within the FOV of the sensor used as calibration targets for the lens. The calibration targets are further discussed below.

In an optional embodiment, one or more ultraviolet (UV) light sources 170 are placed around the lens 120 and the camera body 110. An adhesive may optionally be used to secure the lens 120 to the camera body 110, where the adhesive is only cured when exposed to UV light. Thus, the position of the lens 120 can be freely adjusted until an ideal lens position is determined for lens 120, as discussed herein below, at which point the UV light sources 170 are used to cure the adhesive and fix lens 120 in place. In one embodiment the adhesive may be Dymax® 6-621GEL UV adhesive. In a further embodiment, alternative curing mechanisms are used instead of a UV curing mechanism, such as visible light curing, temperature-based curing, chemical curing, and so on.

Figure 2A:
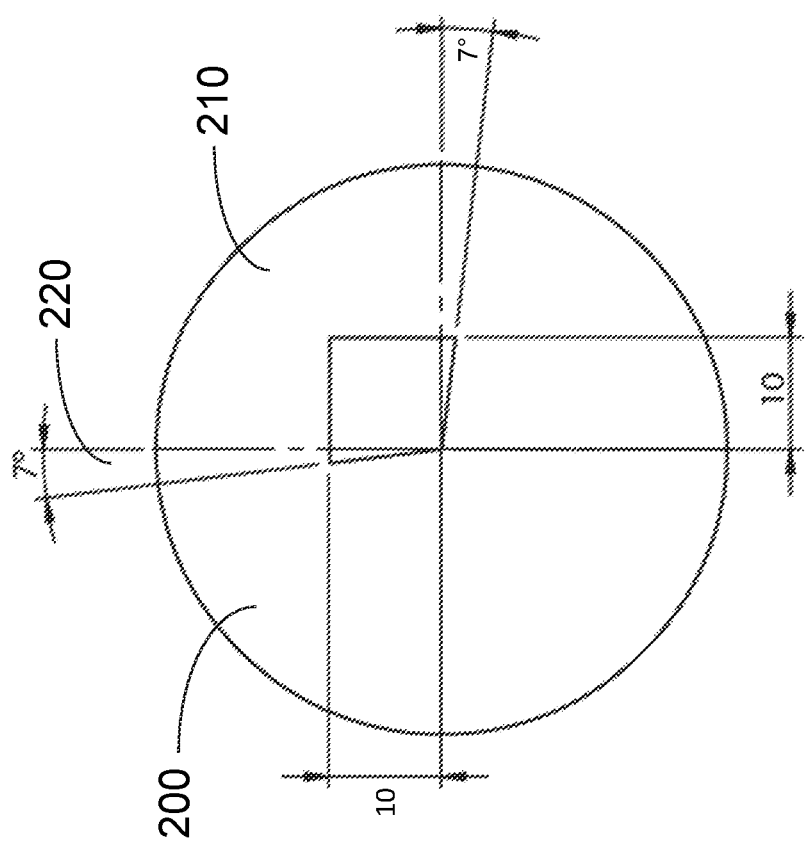
FIG. 2A is a schematic diagram of a calibration target according to an embodiment.

FIG. 2A is a schematic diagram of a calibration target 200 according to an embodiment. The target may include a black body designed to provide a temperature difference as a reference of thermal radiation, and reveal a portion of the black body arranged in a certain pattern that can be recorded by the sensor and analyzed by the image processing software. In an embodiment, an example pattern includes the calibration target 200 with a circular shape and a portion of the circular shape exposed to reveal a black body. For example, a wedge 210 having a specific angle, e.g., an angle of 104 degrees (90 degrees of a quarter circle, with an additional 7 degrees 220 extending outward from each axis of the wedge) is shown. In an embodiment, the size of the wedges 210, e.g., the angle of the wedge, is adjustable, which allows for the control of the pattern appearance, and supports a variety of different patterns to support various application needs. The straight edges, set angle, and curved outer perimeter of the wedge shape provide different useful reference points to assist in determining a sharp focus that indicates calibration of the lens, i.e., that the lens is in the ideal lens position. Having 5 calibration targets 200 placed at defined parts of the FOV of the lens allows for greater optimization of the lens position.

Figure 2B:
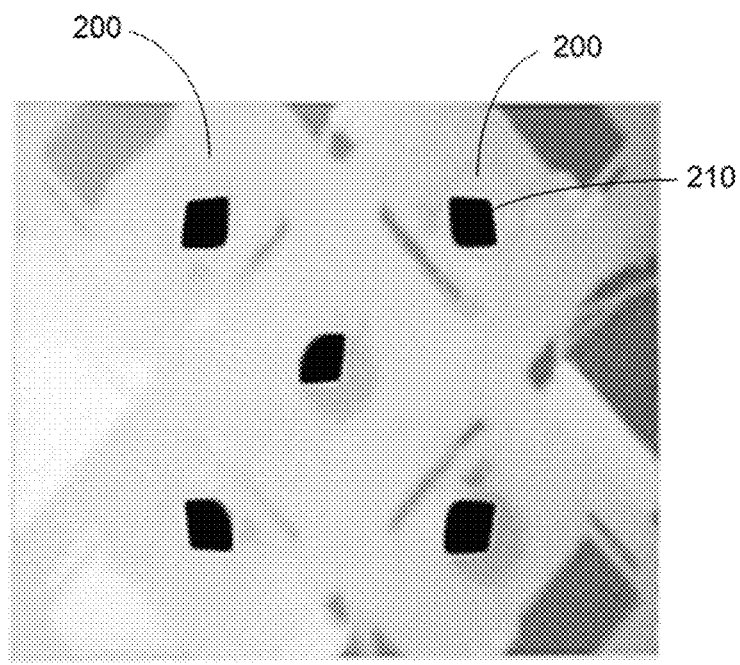
FIG. 2B is an example screenshot of a multiple calibration targets as seen through a calibration system.

FIG. 2B is an example screenshot of multiple calibration targets 200 as seen by the camera through a calibration system. The calibration targets 200 are positioned to maximize coverage of the image sensor area. In an embodiment, five calibration targets 200 are used, where one target is placed toward each corner and one target is placed in the center of the frame. The calibration targets 200 are visible through a collimator, e.g., the collimator 150 of FIG. 1. The five collimators may each contain one calibration target 200 and are positioned to fill the FOV of the camera and the image sensor area.

Figure 3:
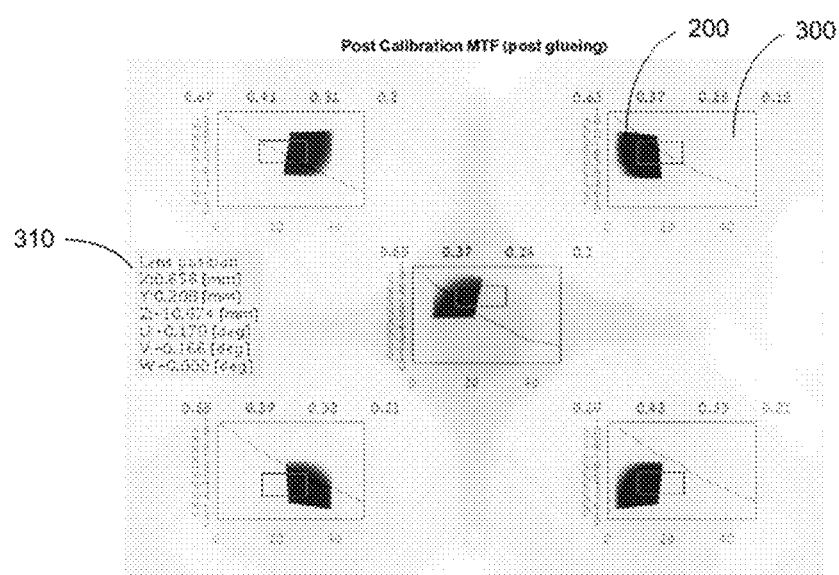
FIG. 3 is an example screenshot of multiple modulation transfer function (MTF) charts projected onto an image of the calibration targets after calibration has been completed.

FIG. 3 is an example screenshot of multiple modulation transfer function (MTF) charts 300 projected onto an image of the calibration targets. An MTF is a tool used to measure imaging quality, including the contrast and the resolution of an optical device. The MTF graph displays the contrast as a function of spatial frequency. In an embodiment, the middle of the image sensor detects higher resolution MTFs compared to the extremities of the sensor. In an embodiment, each section of the frame that contains a calibration target 200 is provided with an MTF chart 300. The position of the lens is adjusted, e.g., by controlling the hexapod 145 and robotic 140 holding the lens 120 of FIG. 1, until each of the MTF charts 300 is optimized. In an embodiment, software is used to analyze the local MTF responses in test images from the target to provide feedback for controlling the hexapod 145 in order to adjust the position of lens 120.

The calibration process includes a converging routine that uses the MTF chart 300 data as a metric in the determination of an optimal position for the lens, i.e., the ideal lens position with respect to the sensor, e.g., sensor 120. In an embodiment, the converging routine takes into consideration the measurements from five targets: one in the middle and one at each of the four corners of an image. In the shown example, the converging routine determines an optimal position where for a spatial frequency of 50, the received MTF value is approximately 0.2 for each of the MTF charts 300.

In an embodiment, the exact lens positioning 310, e.g., measuring in millimeters and degrees from a point of reference, is determined and saved for future reference.

Figure 4:
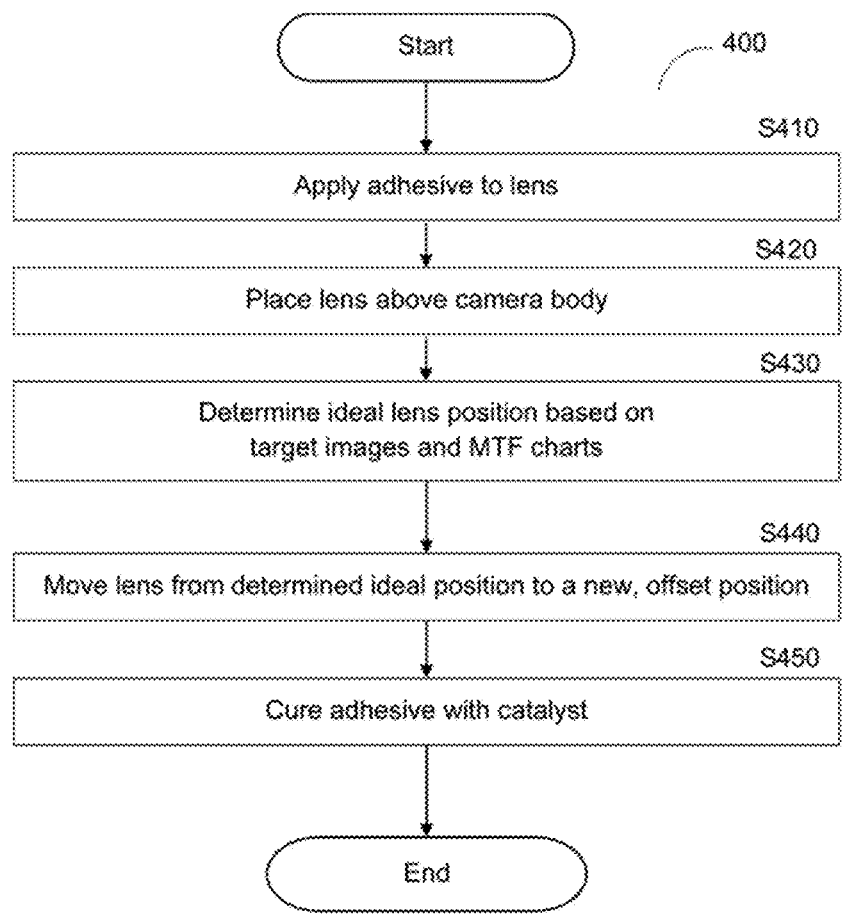
FIG. 4 is an example flowchart illustrating a method for attaching and aligning an infrared camera lens according to an embodiment.

FIG. 4 is an example flowchart 400 illustrating a method for attaching and aligning an infrared camera lens according to an embodiment.

At S410, an adhesive may be applied to a lens configured for an infrared camera. The adhesive may be formulated to be set and cured when exposed to a curing catalyst, such as an ultraviolet (UV) light, a temperature change, a chemical reaction, laser light, and so on. In an embodiment, the lens is handled with a robotic arm, such that the adhesive is applied to the circumference of the lens.

At S420, the lens, with the applied adhesive, is placed above the camera body while still being held, e.g., by the robotic arm. Thus, the positioning of the lens can still be adjusted by the robotic arm or a hexapod attached thereto, while the adhesive has not yet been cured.

At S430, the ideal lens position is determined based on calibration target images and MTF charts associated with those targets, as discussed above in connection with FIG. 3. The position of the lens is adjusted based on feedback from an MTF chart, such that the resolution and contrast of the image from the camera upon which the lens is placed is maximized in all image regions, e.g., in the four corner regions and a center region with one region assigned to one calibration target. In an embodiment, if all of the MTF charts associated with each calibration target images cannot be maximized in a single position, the position that produced the best resolution and contrast uniformly among all the calibration target images is used. At the end of S430 the lens is in its ideal position. Moving the lens so as to adjust its position may be performed by the robot arm under computer control using feedback from the camera sensor.

At S440, the position of the lens is moved from its ideal lens position to a new position. The new, offset position is one that is determined to compensate for adhesive shrinkage. Put another way, since the adhesive shrinks as it is being cured, had the lens been left at its determined ideal position when the curing process is begun, the lens would move away from the ideal position by virtue of being pulled by the adhesive as the adhesive shrinks while it cures. To compensate for such shrinkage, the lens is moved, prior to curing to a position that compensates for such shrinkage, such that at the end of the curing process it is expected that the lens will end up back at its determined ideal position. The offset position, which is a function of the properties of the particular adhesive employed, is determinable empirically or experimentally in a manner well known to those of ordinary skill in the art. Thus, the offset position to which the lens is moved is based on the ideal lens position and the properties of the particular adhesive employed. Advantageously, instead of the lens being moved to a final position from its determined ideal lens position by shrinkage of the glue during curing, and so being improperly located, the final position of the lens after curing is substantially the determined ideal location because the lens was moved to the new, offset position prior to being cured.

At S450, the adhesive is cured and the lens is fixed in place. In an embodiment, curing may be accomplished by exposing the adhesive to intense UV light from multiple directions in order to ensure uniform curing. In one embodiment, the adhesive is cured by exposure to UV light for 30 seconds from 4 UV LED sources, such as UV light sources 170 (FIG. 1) positioned equally around the camera body, e.g., camera body 110 (FIG. 1). In a further embodiment, curing is accomplished by alternative catalysts, such as a visible light source, a temperature change, a chemical reaction, laser light, and so on.

Figure 5:
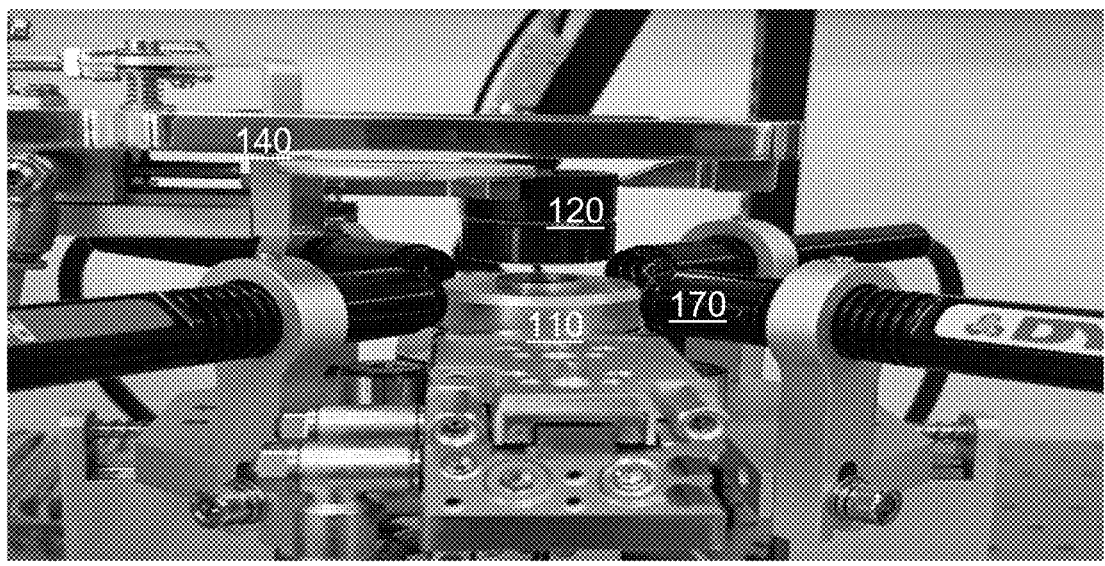
FIG. 5 is an example setup of an infrared lens alignment system and curing light sources, according to an embodiment.

FIG. 5 is an example setup of an infrared lens alignment system and curing lights, according to an embodiment. The robotic arm 140 holds the lens 120 above the camera body 110, which contains an infrared image sensor (not shown). Multiple UV light sources 170, e.g., UV light emitting diodes (LEDs), can be distributed around the lens 120 to provide an even amount of light. The UV light causes a photochemical process which hardens certain resins that may be used as an adhesive to keep the lens 120 in the ideal lens position. In an embodiment, four high-intensity spot curing LEDs operating on a 365 nm wavelength are used although it will be appreciated that other wavelengths may be employed, e.g., depending on the adhesive employed. In a further embodiment, other curing techniques may be used, such as visible light curing, lasers, halogen or tungsten lights, and the like.

According to the disclosed embodiments, a method and system for placing a lens within a lens body, which refers to the holder within which the lens itself is disposed, and note that both were hereinabove simply referred to for convenience as "the lens", e.g., lens 120 (FIGS. 1 and 4), into the ideal lens position with respect to a camera sensor and bonding the lens body to a thermal camera body are provided. In order to maintain a good image quality, the lens' position should be accurately aligned and calibrated. In an embodiment, the alignment is performed by using a 6 degree of freedom robotic arm and collimators projecting black body images onto the sensor. In an embodiment, while the alignment mechanism and the process may be the same, as for example discussed above, the bonding procedure is different.

Figure 6:
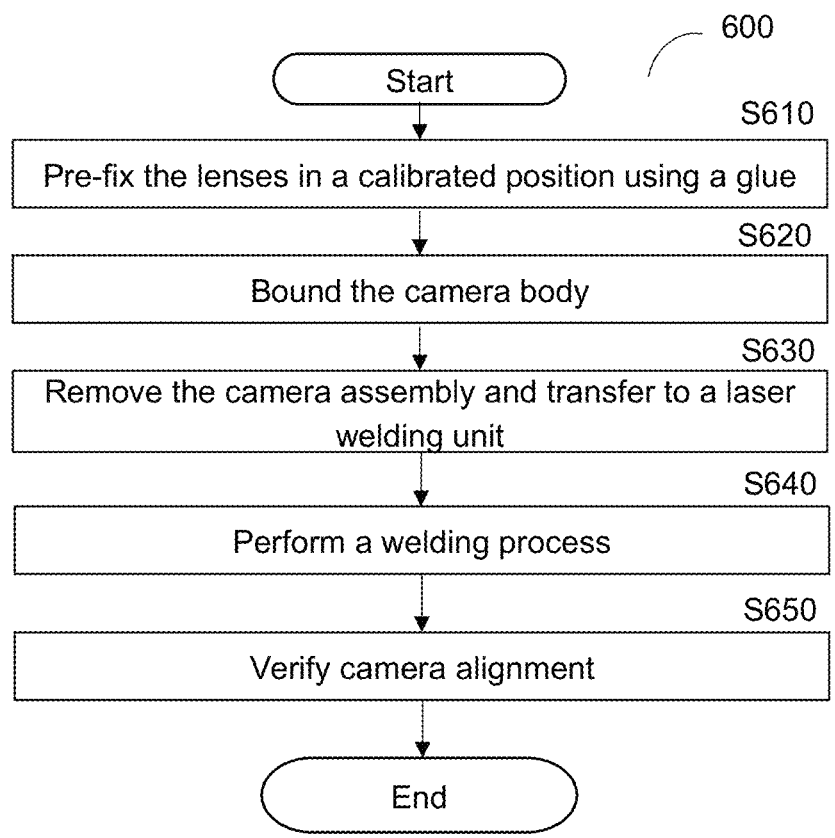
FIG. 6 shows an illustrative method for fixing the lens in the ideal lens position by employing a welding process according to an embodiment.

FIG. 6 shows an illustrative method for fixing the lens in the ideal lens position by employing a welding process according to an embodiment. At S610, a glue is applied to pre-fix the lens in a calibrated position, i.e., the ideal lens position. By pre-fixing it is meant to temporarily hold the lens in position. However, since in this embodiment the glue is only used, as an intermediate stage, the glue need not provide for a strong or a durable bond. The glue merely needs to be sufficient to hold the lens in position once it is no longer being moved, e.g., after the lens has been moved to the ideal lens position. In other words, in one embodiment, as part of step S610 the glue may be applied and then the lens is moved to the ideal lens position by the robotic arm, e.g., in the manner set forth hereinabove, e.g., per step S430. The glue may be applied radially along the lens body circumference and the lens body may be inserted into the camera body, or vice versa. By doing so, of course depending upon the particular glue employed, glue shrinkage may not alter the lens's alignment and so would not cause movement of the lens along the optical axis.

At S620, once the lens body is aligned with the camera body so that the lens is in the ideal lens position, the camera body and lens are bonded by curing the glue at least to a level sufficient to maintain the relative positional relationship between them when moving them together as a unit should such need to be done per optional step S630. At optional step S630, the camera assembly, i.e., the camera body and the lens which are now bonded together, may be removed out of the alignment device and transferred into a device with a welding unit, e.g., a laser welding unit. In an embodiment, the welding unit is computer controlled, i.e., controlled by software executing on a computer, or hardware, that is configured to control the operation of the welding unit.

At S640, a welding process is performed by the welding unit in order to permanently attach by welding the camera body and the lens body so as to make sure that the lens is maintained permanently in the ideal lens position. When optional step S630 is not performed, the welding process of step S640 is performed at the same location at which the alignment of the lens body and camera body is performed. This may be achieved by advancing a welder arm to the camera in the same location.

In one embodiment the welding may be performed only at a number of points along the perimeter of the junction between the camera body and the lens body. In such an embodiment, an extra step may be performed to seal the camera against moisture, e.g., application of a sealant along the perimeter. In another embodiment, the welding process can be performed in a continuous fashion around the entire perimeter at the interface of the camera body and the lens body. As such, the welding scar will completely cover the lens-camera interface. In this case, no additional sealing may be required.

At optional S650, it may be verified, e.g., for quality control purposes, if the camera body and lens body are still aligned such that the lens is in the ideal lens position, or whether the alignment has changed during the welding process. If the camera is found to be misaligned, a realignment process may be performed.

Figure 6A:
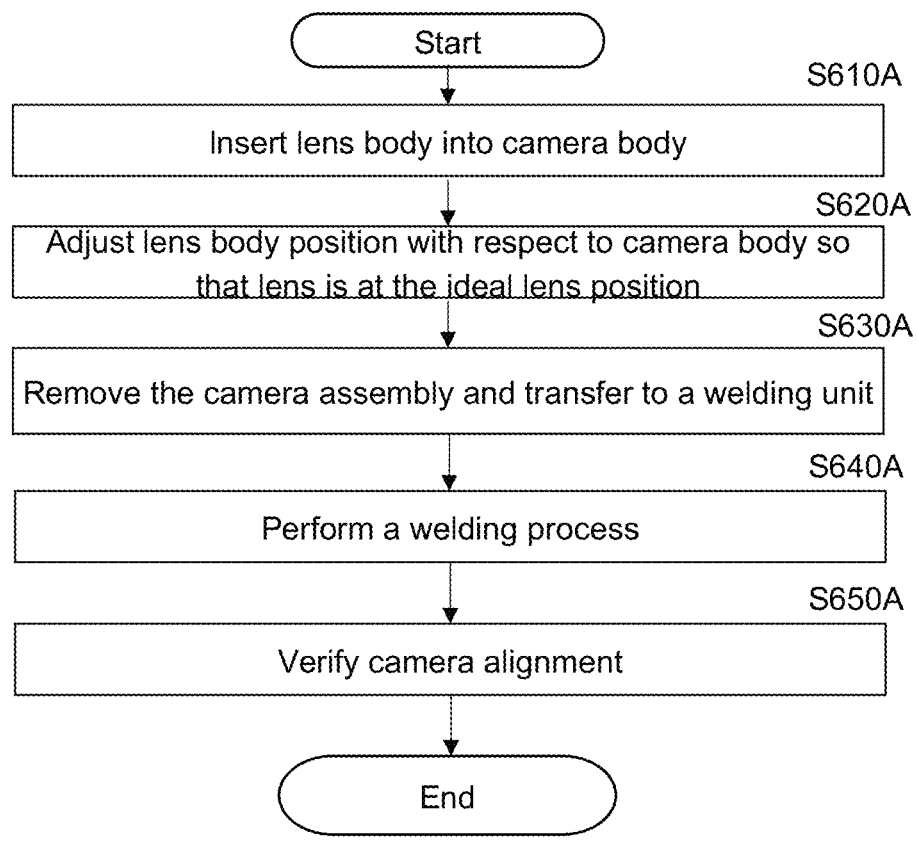
FIG. 6A shows an illustrative method for fixing the lens in the ideal lens position by employing a welding process according to an embodiment.

FIG. 6A shows an illustrative method for fixing the lens in the ideal lens position by employing a welding process according to an embodiment. At S610A, the lens body is inserted into the camera body.

At S620A, the lens body is aligned with the camera body so that the lens is in the ideal lens position. The spatial relationship between the lens body and the camera body is adjusted so that the lens is at the ideal lens position. In one embodiment, this may be achieved by moving the lens body, the camera body, or both. Such movement may be performed by at least one robotic arm. In another embodiment the position of the lens body with respect to the camera body may be controlled by one or more adjustable supports. For example, set screws could be used to control the angle and height of the lens body with respect to the camera body. The method of aligning should be such that in the event that the camera body and lens body assembly needs to be moved to a different location at which a welding unit is located, e.g., in optional step 630A, the relative positional relationship between them as established in step 620A will be maintained. This may be achieved in one embodiment by employing a few, e.g., three, spot welds sufficient to maintain the relative positional relationship between the lens body and the camera body without fully welding them. At optional step S630A, the camera assembly, i.e., the camera body and the lens which are now in a relationship such that the lens is in the ideal lens position which will be maintained, may be removed out of the alignment device and transferred into a device with a welder unit, e.g., a laser welding unit.

At S640A, a welding process is performed by the welding unit in order to permanently attach by welding the camera body and the lens so as to make sure that the lens is maintained permanently in the ideal lens position. When optional step S630A is not performed, the welding process of step S640A is performed at the same location at which the alignment of the lens body and camera body is performed. This may be achieved by advancing a laser welder arm to the camera in the same location or having the laser welding arm at the same location. In an embodiment, the welding unit is computer controlled, i.e., controlled by software executing on a computer, or hardware, that is configured to control the operation of the welding unit.

In one embodiment the welding may be performed only at a number of points along the perimeter of the junction between the camera body and the lens body. In such an embodiment, an extra step may be performed to seal the camera against moisture, e.g., application of a sealant along the perimeter. In another embodiment, the welding process can be performed in a continuous fashion around the entire perimeter at the interface of the camera body and the lens body. As such, the welding scar will completely cover the lens-camera interface. In this case, no additional sealing may be required.

At optional S650A, it may be verified, e.g., for quality control purposes, if the camera body and lens body are still aligned such that the lens is still in the ideal lens position, as the alignment may have changed during the welding process. If the camera is misaligned, a realignment process may be performed.

Figure 7A:
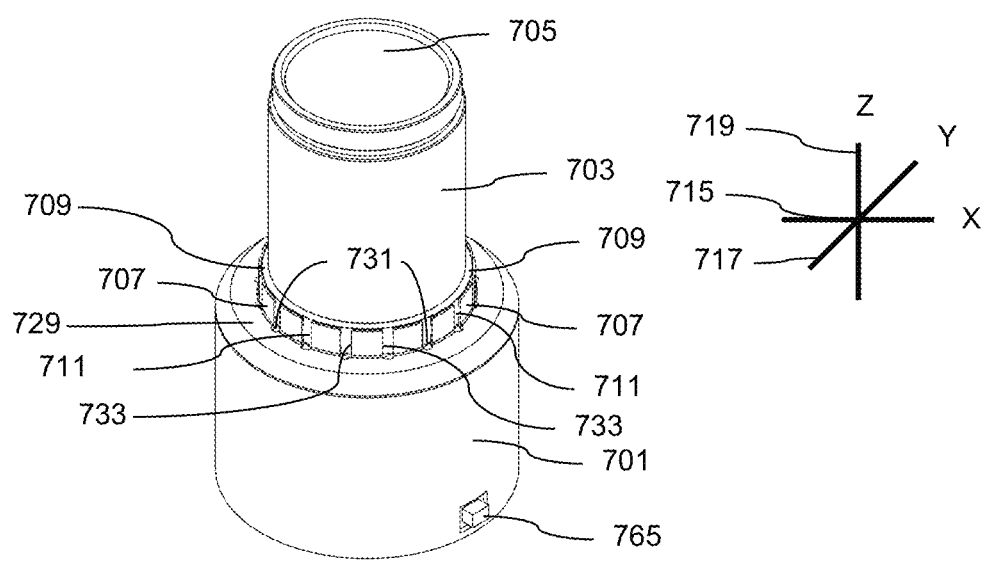
FIGS. 7A-7D shows various views of an illustrative arrangement of an infrared camera having a lens body inserted into a camera body such that they may be permanently joined together in a fixed relationship using welding.

FIG. 7A shows an illustrative arrangement of an infrared camera having a lens body inserted into a camera body such that they may be permanently joined together in a fixed relationship using welding. In particular, shown in FIG. 7 is camera body 701 into which has been inserted lens body 703. Lens body 703 includes lens 705 which is shown as merely representative for illustrative purposes only. Camera body 701 contains slotted cylindrical ring 707 which receives interior thereto lens body 703. Slotted cylindrical ring 707 is effectively permanently attached to camera body 701 using any method available, e.g., glue, welding, friction, or integrated formation, and may be considered as a part of camera body 701 given that such method of attachment is essentially not relevant to the process of FIG. 6 or 6A for placing lens 705 into the ideal lens position and then permanently attaching camera body 701 and lens body 703. Slotted cylindrical ring 707 has a base 729 from which the "fingers" of slotted cylindrical ring 707 extend upward, e.g., parallel to the Z-axis. Holes 731 are between the fingers of slotted cylindrical ring 707.

In addition, lens body 703 is surrounded by ring 709 which is particularly inserted into cylindrical ring 707 of camera body 701 and can be seen as well through slots 711 of slotted cylindrical ring 707. Ring 709 is effectively permanently attached to lens body 703 using any method available, e.g., glue, welding, friction, or integrated formation, and may be considered as a part of lens body 703 given that such method of attachment is essentially not relevant to the process of FIG. 6 or 6A for placing lens 705 into the ideal lens position and then permanently attaching camera body 701 and lens body 703.

Figure 7B:
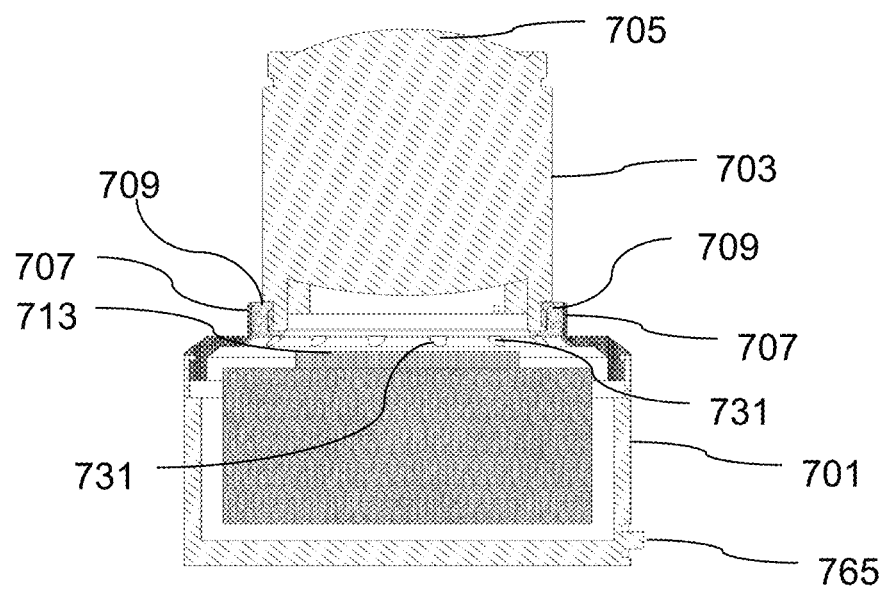
Figure 7C:
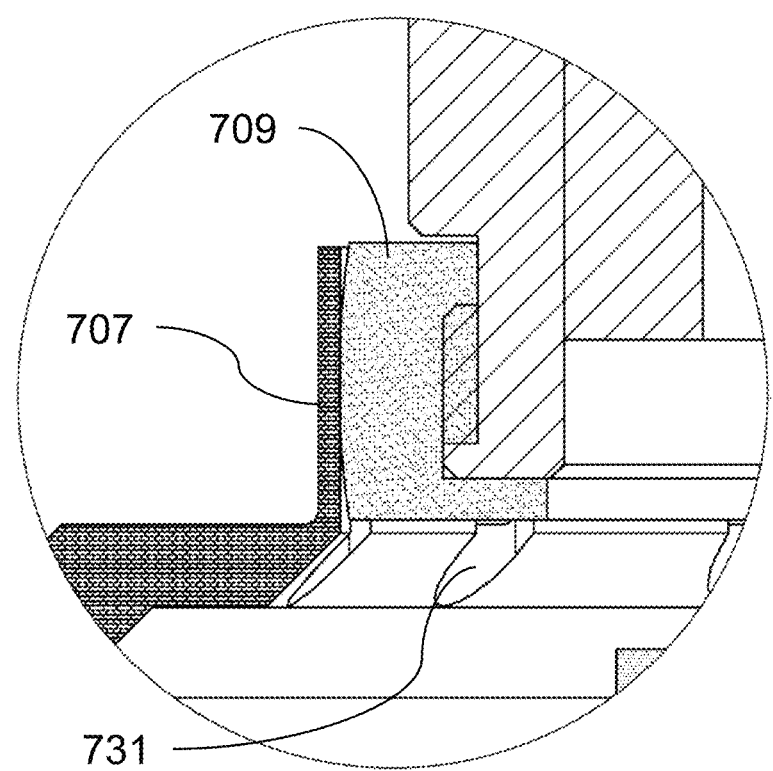

FIG. 7B shows a cut through view of camera body 701 into which has been inserted lens body 703. Also shown in FIG. 7B is sensor 713 for detecting the infrared light. As can be seen better in FIG. 7B ring 709 mates up against slotted cylindrical ring 707. This allows lens body 703 to be moved up and down with respect to sensor 713, as well as tilted with respect thereto. By up and down it is meant translation along Z-axis 719 of FIG. 7A, and by tilting it is meant rotation around X-axis 715 of FIG. 7A and/or rotation around Y-axis 717 of FIG. 7A. More specifically, as seen from the enlarged detailed view of a portion of cylindrical ring 707 and ring 709 shown in FIG. 7C, the surface of ring 709 that mates against cylindrical ring 707, i.e., the distal surface of ring 709 with respect to the center of lens body 703, has a spherical shape. Thus, distal surface of ring 709 may be considered to be a section of a spherical or ball joint and may be referred to herein as spherical ring 709. This facilitates the tilting of lens body 703 with respect to sensor 713 and camera body 701. The proximal surface with respect to the center of lens body 703 of spherical ring 709 may be shaped to match the shape of lens body 703 to which it is affixed, e.g., cylindrical. Thus, this embodiment provides for three degrees of freedom of motion for lens body 703 with respect to camera body 701 prior to gluing or welding.

The tightness of the mating between slotted cylindrical ring 707 and spherical ring 709 may be appropriate to the nature of the process by which lens body 703 will be ultimately permanently affixed to camera body 701. For example, if glue is to be used, e.g., as described in FIG. 6, the tightness can be less than the tightness required for the process of FIG. 6A where glue is not used and instead friction between the parts is relied on to keep the lens body 703 in place. Furthermore, for example, the tightness may be higher if the process of FIG. 6A is employed and camera body 701 and lens body 703 are moved from the first fixture in which the lens position is adjusted to the ideal lens position to a second fixture at which the welding process is performed. Note that this is so because lens body 703 is held in position only by friction and such can only be achieved with a tight fit.

Applicant has recognized that maintaining the lens in the ideal position once it has been achieved but before lens body 703 is sufficiently bonded to camera body 701 to prevent any motion thereof can be a delicate business and thus presents a particular challenge. This is because the forces applied to perform the bonding may cause a movement of lens 705 from the ideal position. In this regard it should be appreciated that the actuators that are used to move lens body 703 so that lens 705 is placed into the ideal lens position are delicate and precise and may typically be insufficient for simply holding lens body 703 in place to overcome the forces that could be exerted by the bonding.

In particular, Applicant has recognized that to avoid moving lens 705 from the ideal lens position that it should be endeavored in particular to avoid causing motion along Z-axis 719 of FIG. 7A. Thus, linear translation along the Z-axis as well as any tilting of lens body 703 with respect to camera body 701 preferably should be avoided after the ideal lens position has been achieved for lens 705.

To this end, Applicants have further recognized that when joining lens body 703 to camera body 701 there should be as little as possible force applied as part of the joining process that could cause motion along the Z-axis, and preferably none. To this end, the bonding is performed so as to result in a minimal, if any, Z-axis component of force.

With regard to bonding by welding, movement of the lens may occur when there is a gap between slotted cylindrical ring 707 and spherical ring 709 at the welding point. This is because the welded area shrinks and, due to the gap, this results in a force being exerted across where the gap was prior to the welding. Avoiding such a force may be achieved by performing the welding in the vicinity of, and preferably right at, the tangent points of contact between slotted cylindrical ring 707 and spherical ring 709. By this it should be appreciated that given that the distal surface of spherical ring 709 with respect to the center of lens body 703 has a spherical shape, there will be, essentially, at least in theory, only a single circumference which is a cross section of the sphere that contacts the interior of slotted cylindrical ring 707 when the parts are made to mate with tight tolerances. Thus, the welding should be along this cross section circumference as it defines a tangent between slotted cylindrical ring 707 and spherical ring 709. Such a tangent circumference can be conceptually visualized more easily in the view of FIG. 7C. Given that perfect precision to weld only exactly along the theoretical tangent circumference is, essentially, practically not possible, the welding should be performed along the theoretical tangent circumference line with the expectation that there will be some extension of the weld "above" and "below" the theoretical tangent circumference that is consistent with manufacturing procedures and tolerances.

It should also be appreciated that sections of the entire tangent line may not be visible, e.g., because they are hidden behind the "fingers" of slotted cylindrical ring 707, i.e., the portions of slotted cylindrical ring 707 that are not slots 711. Nevertheless, there is no need for the portions of the tangent circumference that run behind the "fingers" of slotted cylindrical ring 707 to be visible in order to perform the welding along such portions. This is because the welding may be performed through the "fingers" of slotted cylindrical ring 707 by heating to welding temperature the visible portion of slotted cylindrical ring 707 behind which the tangent circumference lies. In this regard, for example, a weld may be made through the aluminum that may make up slotted cylindrical ring 707, e.g., through 0.5 mm thick aluminum. Illustrative tangent points 733 of FIG. 7A are where the tangent circumference of spherical ring 709 becomes exposed, as it conceptually extends along slots 711, and where the junction of slotted cylindrical ring 707 meets the tangent circumference and so is a location suitable for a weld point.

Slots 711 ease detecting the tangent circumference by providing visual or sensory access to at least part of spherical ring 709. In one embodiment of the invention, computer vision may be employed to detect the tangent circumference. In another embodiment of the invention, triangulation, e.g., using one or more distance sensors, is employed to detect the tangent circumference. Knowing where the tangent circumference is enables the welding to be performed along it.

Figure 7D:
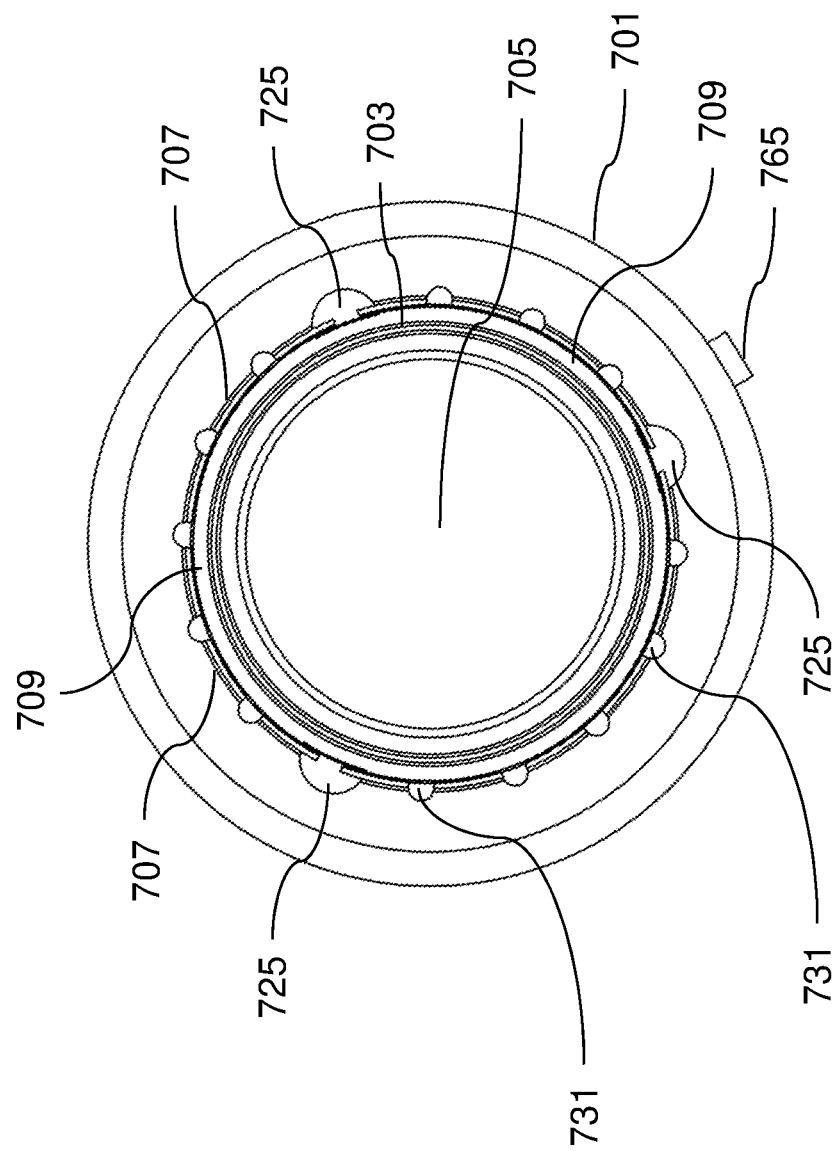

In the event the process of FIG. 6 is employed with glue, the glue may be applied in accordance with the illustrative application shown in FIG. 7D, which shows a top view camera body 701 and lens body 703. More specifically, glue dots 725 may preferably be applied in several of slots 711 that are equally spaced around cylindrical ring 707, where 3 dots are preferably the minimum number employed. Curing is preferably performed as soon as the lens is placed in the ideal lens position. The glue dots so placed are expected to have minimal effect on the placement of lens 705 with respect to the ideal lens position in which it has been placed prior to curing. Also, the adhesive should be applied so as to bond a portion of slotted cylindrical ring 707 to a portion of spherical ring 709. While not necessarily required, the glue may be placed along the tangent circumference at the point where sides of the "fingers" of slotted cylindrical ring 707 are exposed and the glue can reach the sides of the "fingers" of slotted cylindrical ring 707 and the portion of spherical ring 709 exposed by slots 711. In other words, the exposed area of mating, e.g., the exposed area where there can be seen contact points suitable for gluing or welding, between slotted cylindrical ring 707 and spherical ring 709 so that slotted cylindrical ring 707 and spherical ring 709 may be bonded together.

Good bonding is achievable because uncoated aluminum, of which slotted cylindrical ring 707 and spherical ring 709 may be made, reflects very well the ultraviolet light typically employed for curing the glue. In some embodiments the adhesive may be applied at any visible location at which a weld could be made. By so applying and curing the glue, in the event the glue is of a type that shrinks, e.g., substantially, on curing, the effect of shrinkage of the glue during curing on motion of lens 705 from its ideal position is reduced or eliminated as well.

The adhesive should be placed in enough areas so that after it is cured the resulting structural strength will be enough to withstand the various forces that may be applied on the combined camera body and lens body until welding is fully complete. After welding is fully complete, the adhesive strength is no longer relevant. Indeed, at that point the adhesive may even be removed in some embodiments.

Welding may be performed anywhere along the tangent circumference where glue was not deployed. It may be advisable in some embodiments to initially perform the welding at three areas that are evenly distributed around cylindrical ring 707. Once camera body 701 and lens body 703 are adequately secured, e.g., by the welding alone or the welding in combination with the glue, additional welding can then be performed beyond the tangent circumference line between ring 709 and slotted cylindrical ring 707. Such may be done, for example, to increase mechanical strength or provide for sealing between camera body 701 and lens body 703.

In other embodiments, e.g., following the process of FIG. 6A, when using the components of FIG. 7A, in lieu of first gluing, welding may be performed initially in a number of limited locations, e.g., locations where glue would have been placed as described above in connection with the process of FIG. 6.

Connector 765 (FIG. 7A) may be used to deliver signals to and retrieve signals from the assembled infrared camera.

Figure 8A:
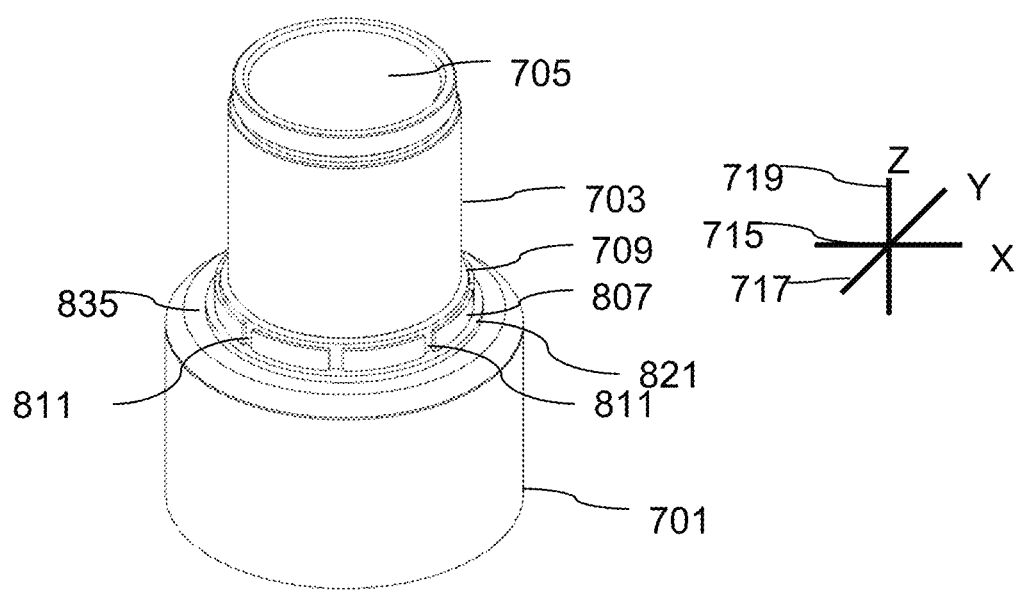
FIGS. 8A-8F shows various views of an illustrative arrangement of an infrared camera having a lens body inserted into a camera body such that they may be permanently joined together in a fixed relationship using welding.

FIG. 8A shows another illustrative embodiment for use with the methods of FIGS. 6 and 6A. This embodiment provides for five degrees of freedom of motion for lens body 703 with respect to camera body 701 prior to gluing or welding. These include the same three degrees provided by the embodiment of FIG. 7A-7D along with planar motion, i.e., motion in the X direction and the Y direction which together form the X-Y plane which is the plane of sensor 713.

Figure 8B:
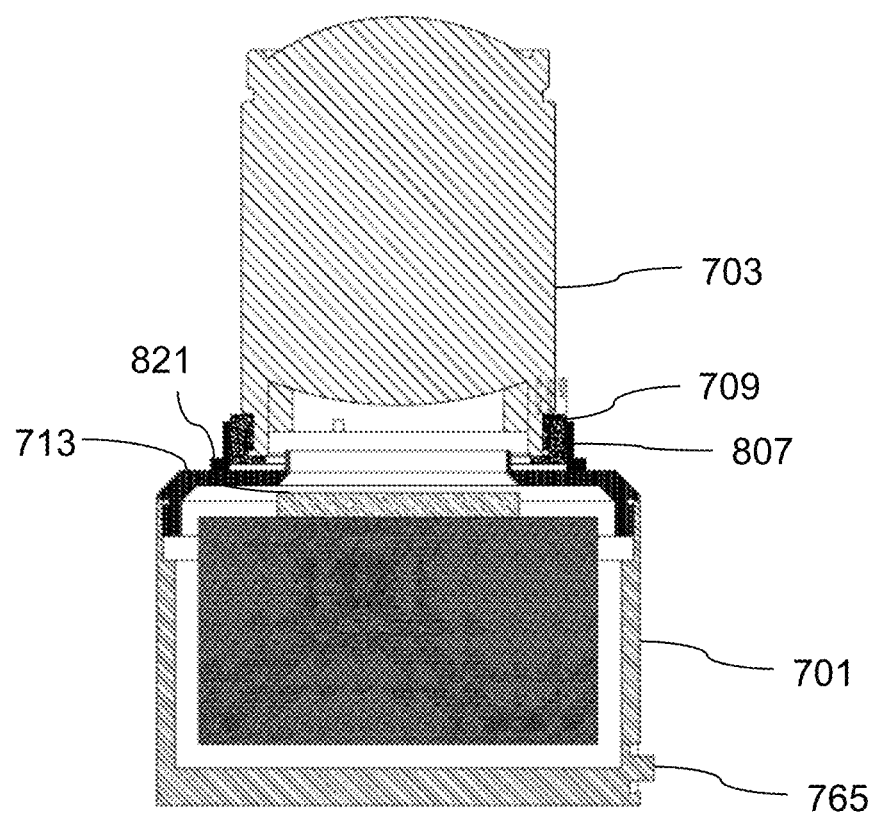
Figure 8C:
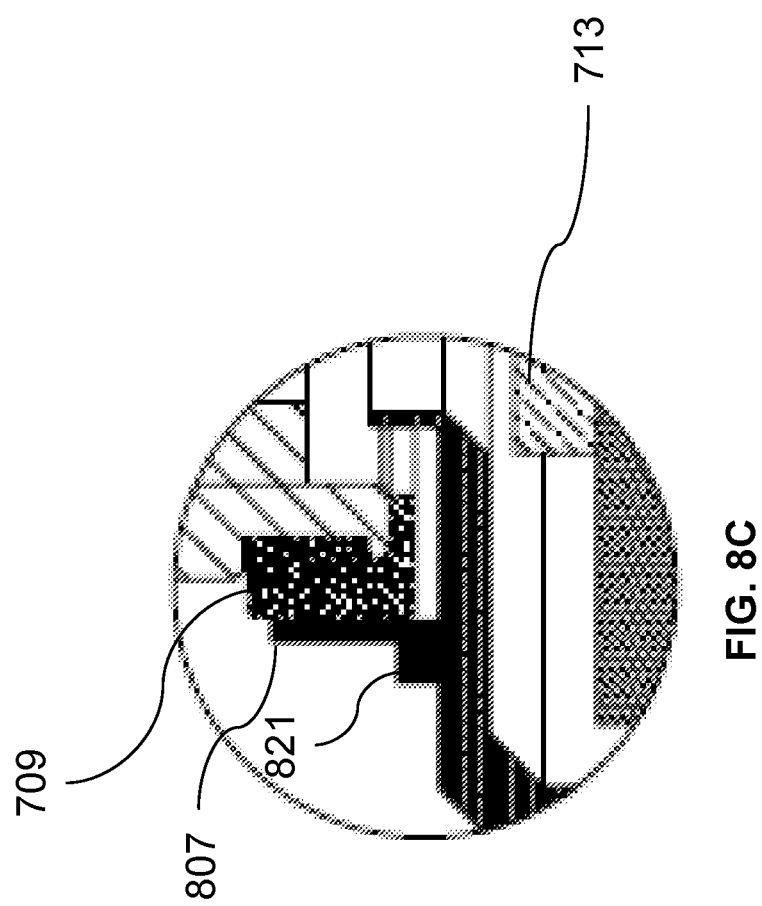

In FIG. 8A, slotted cylindrical ring 707 of FIG. 7 has been replaced with slotted cylindrical ring 807 which has longer sections, i.e., longer "fingers" between the slots, i.e., slots 811, and also has lip or base 821 which sits on camera body top 835 which is, in turn, on top of camera body 701. By slotted cylindrical ring 807 being formed with lip 821 slotted cylindrical ring 807 can slide in the X-Y plane on top of camera body top 835. This can be seen more clearly in FIG. 8C which shows an enlarged detailed view of the cut through view of camera body 701 into which has been inserted lens body 703 that is shown in FIG. 8B or in the exploded view of FIG. 8F.

In the embodiment of FIG. 8A, unlike the embodiment of FIG. 7A, slotted cylindrical ring 807 is not effectively permanently attached to camera body 701. Instead, as noted above, slotted cylindrical ring 807 is initially able to slide with respect to camera body top 835. Camera body top 835 is permanently attached to camera body 701 using any method available, e.g., glue, welding, friction, or integrated formation, and may be considered as a part of camera body 701 given that such method of attachment is essentially not relevant to the process of FIG. 6 or 6A for placing lens 705 into the ideal lens position and then permanently attaching camera body 701 and lens body 703.

Figure 8D:
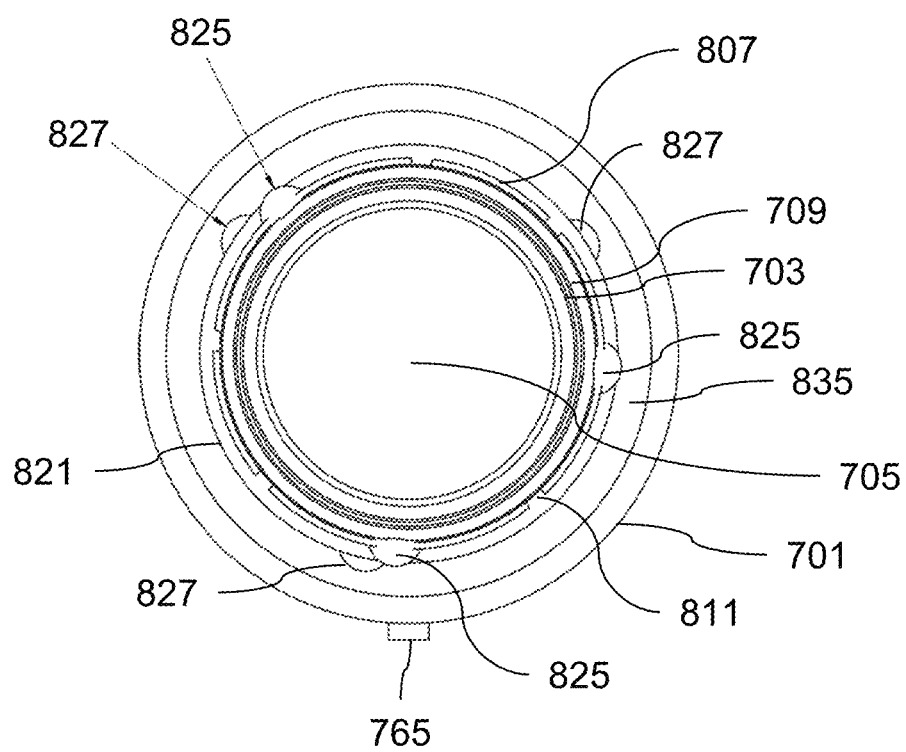

In the event the process of FIG. 6 is employed, the glue noted therein may be applied in accordance with the illustrative application shown in FIG. 8D, which shows a top view camera body 701 and lens body 703. More specifically, glue dots 825 may preferably be applied in several of slots 811 equally spaced around cylindrical ring 707, where 3 dots are preferably the minimum number employed. This is to help prevent motion along the Z-axis or tilt motion. In addition, glue dots 827 may preferably be applied equally spaced around cylindrical ring 707 at the interface of lip 821 and top of camera body 835, where 3 dots are preferably the minimum number employed. This is to prevent planar motion, i.e., motion along the X-Y plane. Curing is preferably performed as soon as the lens is placed in the ideal lens position. The glue dots should be placed so that any shrinkage of the glue during cure will have minimal effect on the placement of lens 705 with respect to the ideal lens position in which it has been placed prior to curing. The adhesive can be applied on any two exposed parts and good bonding is achievable because uncoated aluminum, of which at least the relevant portions of camera body 701 and lens body 703 may be made, reflects very well the ultraviolet light typically employed for curing the glue. It should be appreciated that the adhesive may be applied anywhere a weld could be made except that a weld may be made through the aluminum that may make up slotted cylindrical ring 807, e.g., through 0.5 mm thick aluminum, while adhesive may only be applied on outer surfaces. By so applying and curing the glue, the effect of shrinkage of the glue during curing on motion of lens 705 from its ideal position is reduced or eliminated as well.

The adhesive should be placed in enough areas so that after it is cured the resulting structural strength will be enough to withstand the various forces that may be applied on the combined camera body and lens body until welding is complete. Welding of spherical ring 709 to slotted cylindrical ring 807 may then be performed in various ones of the areas along the tangent circumference that do not have therein glue. Welding may be performed along the tangent circumference within ones of slots 811 that do not contain glue and/or through the various fingers of slotted cylindrical ring 807. In addition, welding may be performed at various locations around the perimeter of spherical ring 807 where lip 821 meets camera body 701. After welding is complete, the adhesive strength is no longer relevant. Indeed, at that point the adhesive may even be removed in some embodiments.

Figure 8E:
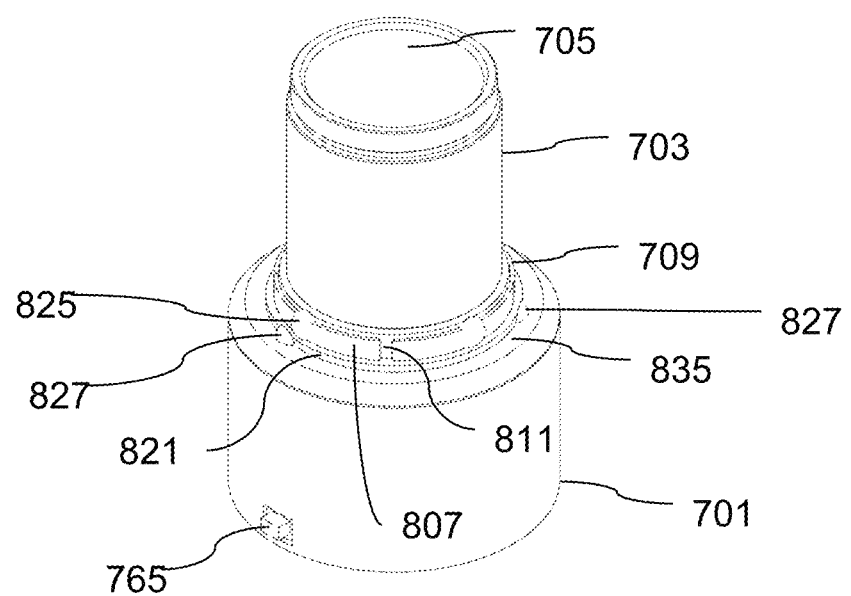
Figure 8F:
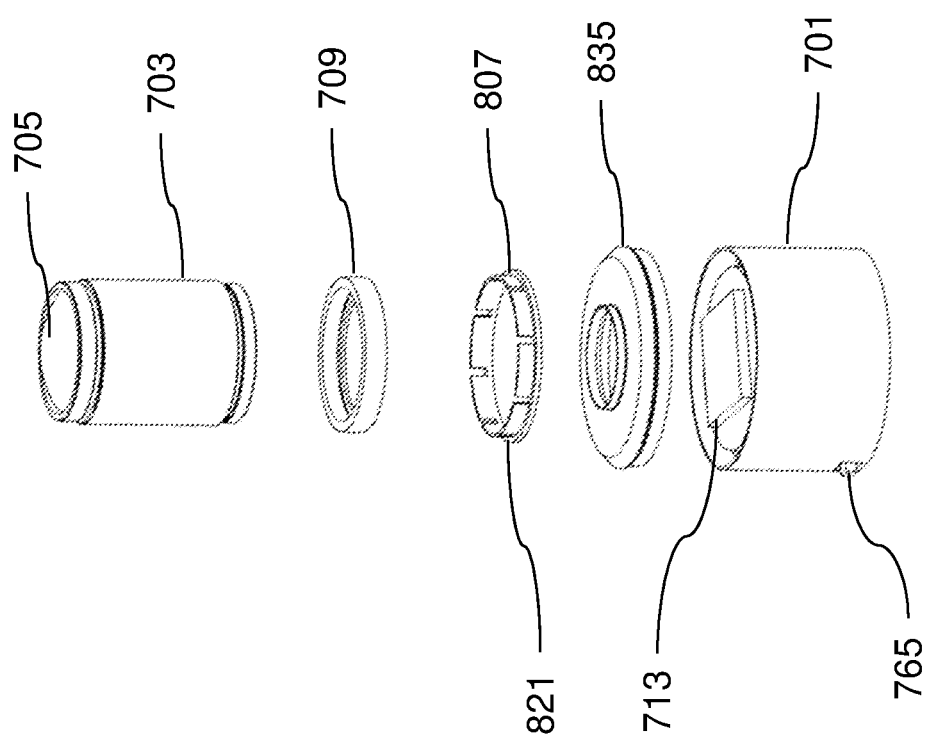

FIG. 8E shows the same view as FIG. 8A but with an illustrative example of the adhesive applied. FIG. 8F shows an exploded view of the components of FIG. 8A. Before inserting lens body 703 into camera body 701, spherical ring 709 is permanently affixed to lens body 703 and becomes part thereof. Also, as noted above, camera body top 835 is likewise permanently affixed to camera body 701. Also as noted above, as can be seen more easily in FIG. 8E, camera body top 835 may provide a planar surface along which slotted cylindrical ring 807 can move.

In other embodiments, e.g., following the process of FIG. 6A, when using the components of FIG. 8A, in lieu of first gluing, welding may be performed in the locations where glue would have been placed as described above in connection with the process of FIG. 6.

Figure 9A:
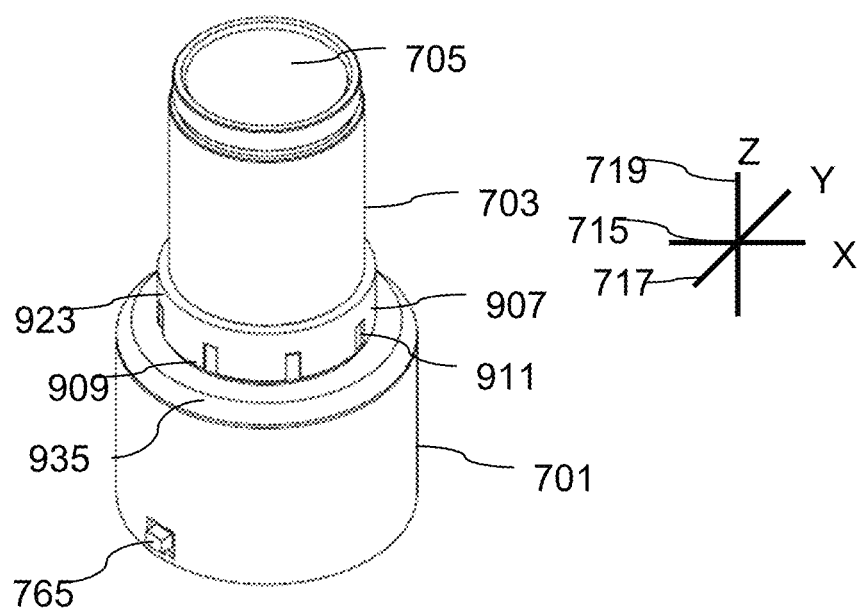

FIG. 9A shows another illustrative embodiment for use with the methods of FIGS. 6 and 6A. This embodiment provides for the same three degrees of freedom of motion for lens body 703 with respect to camera body 701 prior to gluing or welding as provided by the embodiment of FIG. 7A-7D.

Camera body top 935 is permanently attached to camera body 701 using any method available, e.g., glue, welding, friction, or integrated formation, and may be considered as a part of camera body 701 given that such method of attachment is essentially not relevant to the process of FIG. 6 or 6A for placing lens 705 into the ideal lens position and then permanently attaching camera body 701 and lens body 703. Spherical ring 909 in turn is permanently attached to camera body top 935. This can be more easily seen in the exploded view of FIG. 9D.

Slotted cylindrical ring 907 is permanently attached to lens body 703 using any method available, e.g., glue, welding, friction, or integrated formation, and may be considered as a part of lens body 703 given that such method of attachment is essentially not relevant to the process of FIG. 6 or 6A for placing lens 705 into the ideal lens position and then permanently attaching camera body 701 and lens body 703. Note that unlike the embodiment of FIG. 7, slots 911 of slotted cylindrical ring 907 do not extend upward substantially the whole height of slotted cylindrical ring 907 but rather only extend partially upward in that there is a solid band 923 above slots 911. Also, the "fingers" of slotted cylindrical ring 911 extend downward from solid band 923.

Camera body 701 and lens body 703 are mated by having slotted cylindrical ring 907 be placed over spherical ring 909. Spherical ring 909 is thus within slotted cylindrical ring 907 of lens body 703. Spherical ring 909 can be seen through slots 911 of slotted cylindrical ring 907. This can be more easily visualized when looking at exploded view 9D.

Figure 9B:
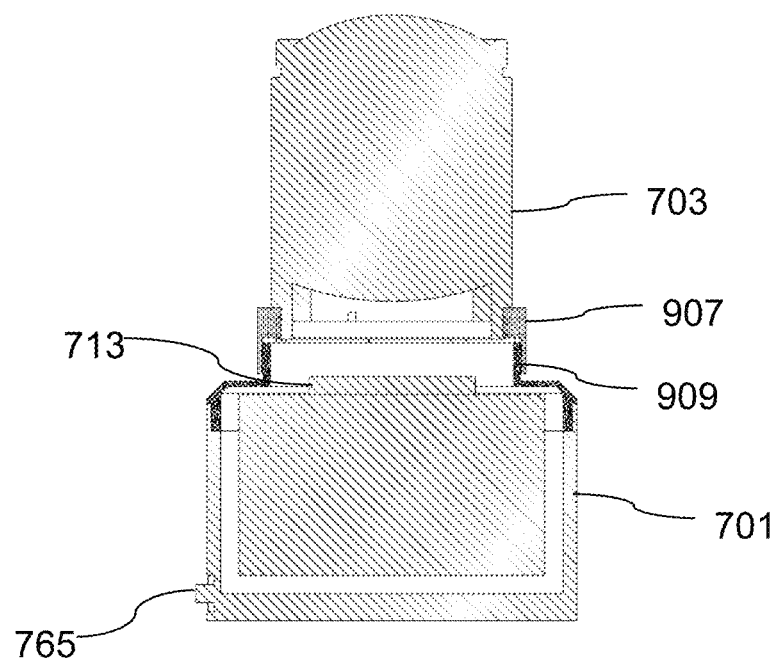

FIG. 9B shows a cut through view of camera body 701 into which lens body 703 has been inserted. Also shown in FIG. 9B is sensor 713 for detecting the infrared light. As can be seen better in FIG. 9B, spherical ring 909 mates up against slotted cylindrical ring 907. This allows lens body 703 to be moved up and down with respect to sensor 713, as well as tilted, e.g., rotated around the X-axis and/or the Y axis with respect thereto. An enlarged detailed view of a portion of cylindrical ring 907 and ring 909 is shown in FIG. 9C.

Figure 9D:
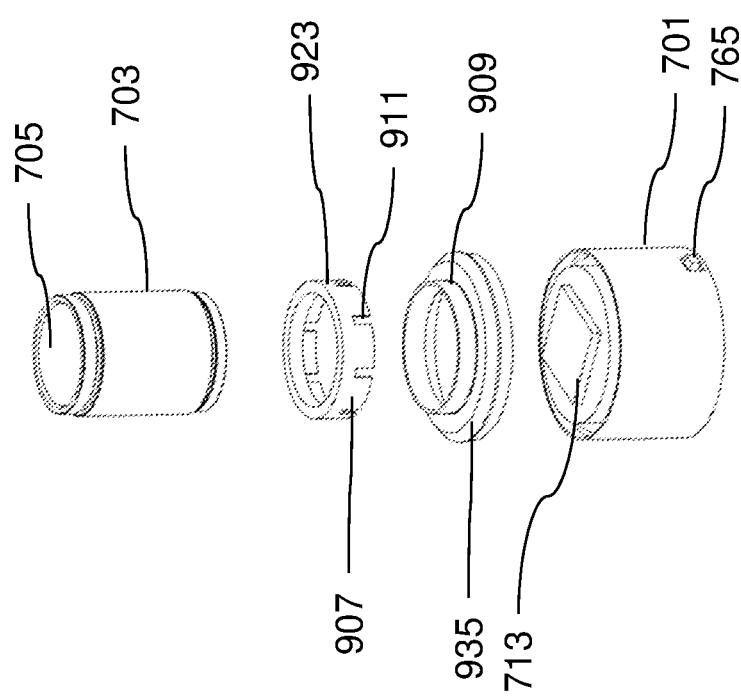

FIG. 9D shows an exploded view of the components of FIG. 9A. As indicated above, before inserting lens body 703 into camera body 701 spherical ring 709 is permanently affixed to camera body top 935 which is in turn permanently affixed to camera body 701 and becomes part thereof. In addition, slotted cylindrical ring 907 is permanently affixed to lens body 703 and becomes part thereof. Thus, spherical ring 909 and slotted cylindrical ring 907 are arranged oppositely of spherical ring 709 and slotted cylindrical ring 707 of FIG. 7A.

Although not shown in FIGS. 9A-9D, when performing the process of FIG. 6 glue may be employed in various ones of slots 911 in the manner described hereinabove. Thereafter, welding may be performed anywhere along the tangent circumference where glue was not deployed in the manner described hereinabove. It may be advisable in some embodiments to initially perform the welding at three areas that are evenly distributed around cylindrical ring 907. Once camera body 701 and lens body 703 are adequately secured, e.g., by the welding alone or the welding in combination with the glue, additional welding can then be performed beyond the tangent circumference line between spherical ring 909 and slotted cylindrical ring 907. Such may be done, for example, to increase mechanical strength or provide for sealing between camera body 701 and lens body 703.

In other embodiments, e.g., following the process of FIG. 6A, when using the components of FIG. 9A, in lieu of first gluing, welding may be performed initially in a number of limited locations, e.g., locations along the tangent circumference where glue would have been placed as described above in connection with the process of FIG. 6.

Figure 10A:
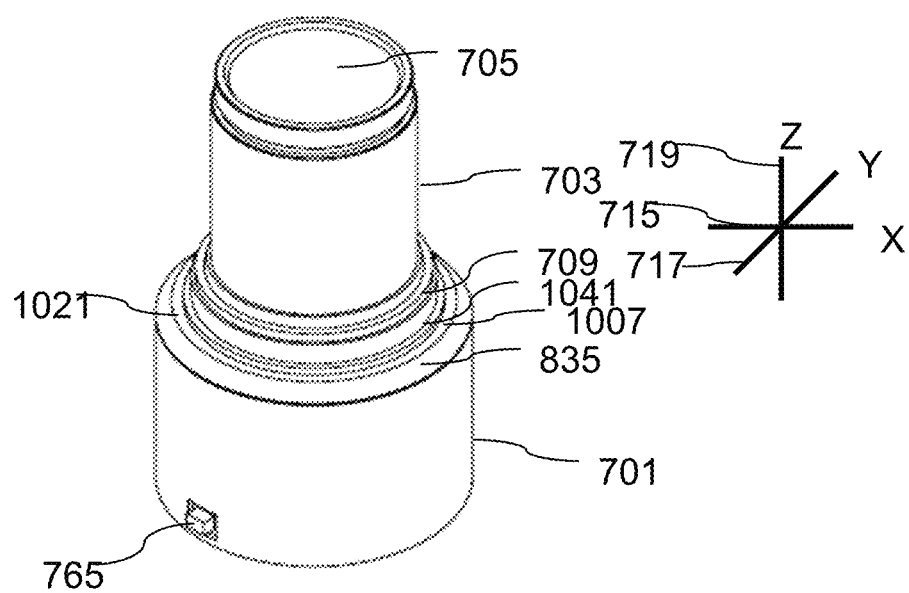

FIG. 10A shows another illustrative embodiment for use with the methods of FIGS. 6 and 6A. This embodiment provides for five degrees of freedom of motion for lens body 703 with respect to camera body 701 prior to gluing or welding. These include the same three degrees provided by the embodiment of FIG. 7A-7D along with planar motion, i.e., motion in the X direction and the Y direction which together form the X-Y plane which is the plane of sensor 713.

In FIG. 10A, slotted cylindrical ring 707 of FIG. 7 has been replaced with solid cylindrical ring 1007. Solid cylindrical ring 1007, similar to slotted cylindrical ring 807 (FIG. 8A) has base or lip 1021 and so it can slide over camera body top 835 in the X-Y plane on top of camera body 701. More specifically, in the embodiment of FIG. 10A, unlike the embodiment of FIG. 7A, solid cylindrical ring 1007 is not effectively permanently attached to camera body 701. Instead, solid cylindrical ring 1007 is initially able to slide with respect to camera body top 835. Camera body top 835 is permanently attached to camera body 701 using any method available, e.g., glue, welding, friction, or integrated formation, and may be considered as a part of camera body 701 given that such method of attachment is essentially not relevant to the process of FIG. 6 or 6A for placing lens 705 into the ideal lens position and then permanently attaching camera body 701 and lens body 703.

To this end, solid cylindrical ring 1007 has a lip or base 1021 that is similar to lip 821 of the embodiment of FIG. 8. Lip or base 1021, more easily seen in FIGS. 11B-11D, sits on camera body top 835 thus allowing solid cylindrical ring 1007 to be able to initially slide over the X-Y plane on top of camera top 835 prior to being permanently affixed. This can be seen more clearly in FIG. 10C which shows an enlarged detailed view of the cut through view of camera body 701 or in FIG. 10D which shows an exploded view.

As in the embodiment of FIG. 7A, lens body 703 is surrounded by spherical ring 709. Spherical ring 709 is effectively permanently attached to lens body 703 using any method available, e.g., glue, welding, friction, or integrated formation, and may be considered as a part of lens body 703 given that such method of attachment is essentially not relevant to the process of FIG. 6 or 6A for placing lens 705 into the ideal lens position and then permanently attaching camera body 701 and lens body 703.

Figure 10B:
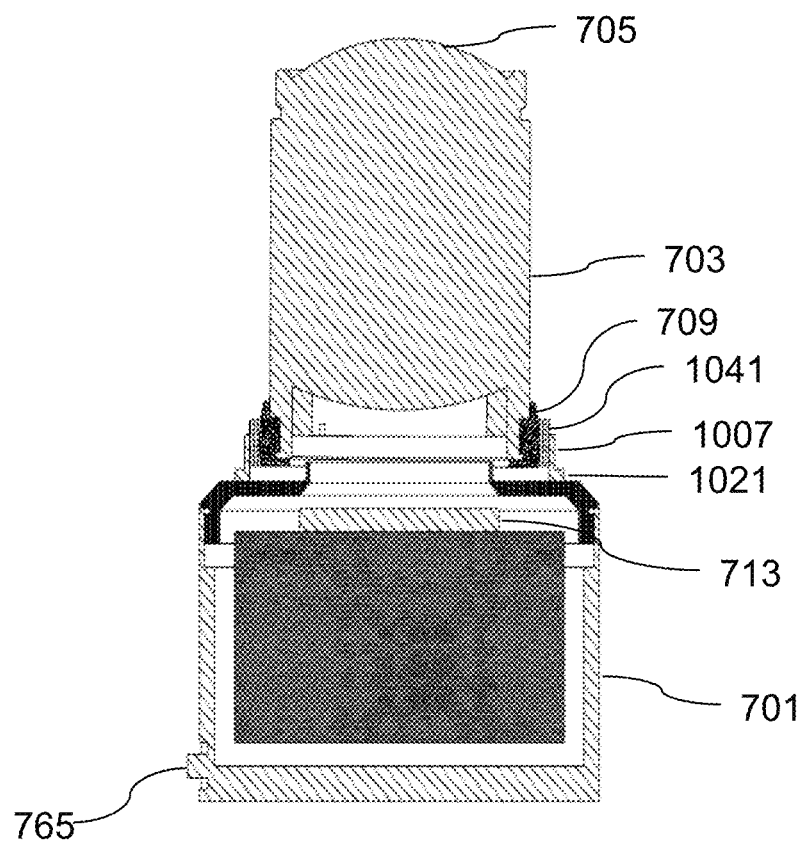
Figure 10D:
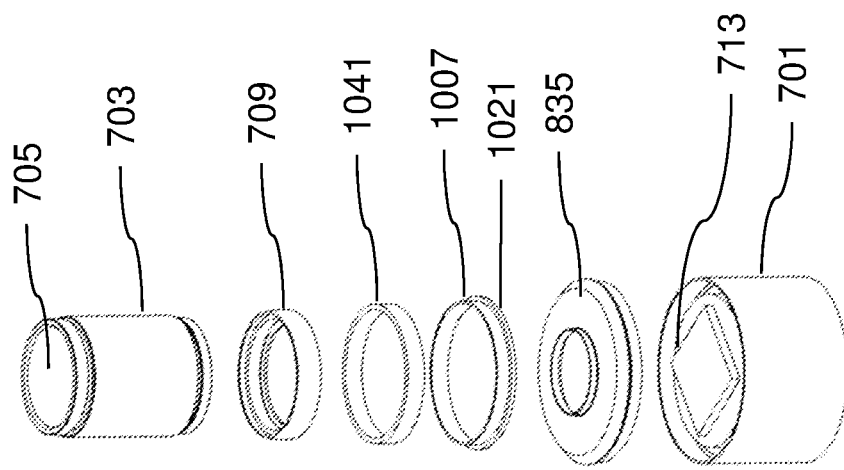

Cylindrical-spherical adapter 1041 is interposed between spherical ring 709 and solid cylindrical ring 1007. As can be seen in FIG. 10B or 10C, the surface of cylindrical-spherical adapter 1041 that mates against spherical ring 709, i.e., the proximal surface of cylindrical-spherical adapter 1041 with respect to the center of lens body 703, has a spherical shape. This facilitates the tilting of lens body 703 with respect to sensor 713 and camera body 701. The distal surface with respect to the center of lens body 703 of cylindrical-spherical adapter 1041 that mates against solid ring 1007 may be cylindrical in shape to match the shape of solid ring 1007.

Welding may be performed at 1) the exposed interface between spherical ring 709 and cylindrical-spherical adapter 1041, i.e., the circumference indicated by 1061, 2) the exposed interface between cylindrical-spherical adapter 1041 and solid ring 1007, i.e., the circumference indicated by 1063, and 3) the interface between solid ring 1007 and camera body top 835, i.e., the circumference indicated by 1065. The welding may be performed continuously along each interface, i.e., around the entire circumference, thus allowing for sealing by welding. In other words, such welding seals the internal area and it also permanently fixes the position of lens body 703 with respect to camera body 701.

Because welding may be performed through exterior layers, welding may also be performed, or performed instead, anywhere along the interface between spherical ring 709 and cylindrical-spherical adapter 1041, even where not exposed, and also anywhere along the interface between cylindrical-spherical adapter 1041 and solid ring 1007. This is also possible because the interface between spherical ring 709 and cylindrical-spherical adapter 1041 is spherical, and hence there is no tangent circumference, and similarly, the interface between cylindrical-spherical adapter 1041 and solid ring 1007 is cylindrical, and hence there is no tangent circumference.

As such, it should be appreciated that the use of cylindrical-spherical adapter 1041 between spherical ring 709 and solid cylindrical ring 1007 may provide several advantages.

The first advantage is the ability to have full contact between the surfaces being welded. Such full contact may prevent unwanted movement during welding, given that such unwanted movement might be caused by deviations in the identification of the tangent line which is to be welded. Indeed, such unwanted movement has been observed when welding is performed above or below the tangent line and such unwanted movement moves lens 705 from the ideal lens position. The full contact may make the welded bond stronger, because it enables a massive continuous metal connection between the two components instead of there being only one thin line of welding on the tangent line.

The second advantage which may be achieved by this arrangement is freedom of the weld position in that welding may be performed on any visible area of the external part being welded. Such may also provide for the further advantage of allowing automatic welding which is performed without the need to adjust the welding position.

The third advantage which may be achieved by this arrangement is protection of the internal area, in particular, for example, protection against heat or possible contamination by elements such as gas, smoke, and particles, that may develop during the welding process. In this configuration, the welding is done at the external material and so there is a solid barrier between the welding area and the internal area.

If implementing the process of FIG. 6, glue may be placed along a number of points, e.g., 3, around each of the interfaces. If implementing the process of FIG. 6A, a few, e.g., three, spot welds sufficient to maintain the relative positional relationship between the lens body and the camera body without fully welding them may be made, e.g., along the interfaces. Alternatively, friction may be used to hold the parts sufficiently together.

Figure 11A:
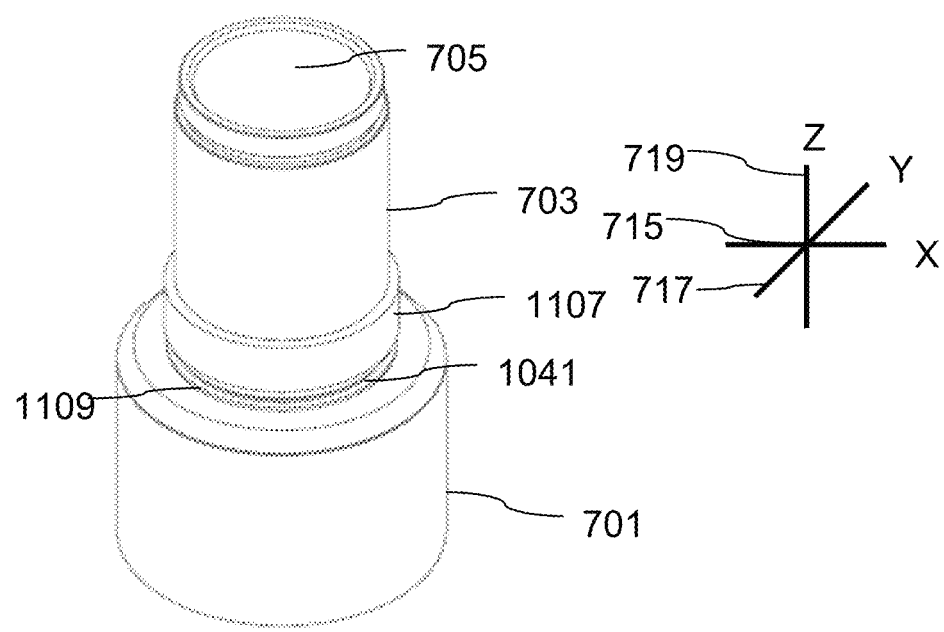
FIGS. 11A-11D shows various views of an illustrative arrangement of an infrared camera having a lens body inserted into a camera body such that they may be permanently joined together in a fixed relationship using welding.

FIG. 11A shows another illustrative embodiment for use with the methods of FIGS. 6 and 6A. This embodiment provides for five degrees of freedom of motion for lens body 703 with respect to camera body 701 prior to gluing or welding. These include the same three degrees provided by the embodiment of FIG. 7A-7D along with planar motion, i.e., motion in the X direction and the Y direction which together form the X-Y plane which is the plane of sensor 713.

The embodiment of FIG. 11A combines the approach of the embodiments FIGS. 9A and 10A. By this it is meant that similar to the embodiment FIG. 9 the cylindrical ring 1107 is attached to lens body 703 and spherical ring 1109 is placed on camera body top 835 which in turn is permanently attached to camera body 701 using any method available, e.g., glue, welding, friction, or integrated formation, and may be considered as a part of camera body 701 given that such method of attachment is essentially not relevant to the process of FIG. 6 or 6A for placing lens 705 into the ideal lens position and then permanently attaching camera body 701 and lens body 703.

In addition, similar to the embodiment FIG. 10A, cylindrical-spherical adapter 1041 is employed to couple between solid cylindrical ring 1107 and spherical ring 1109.

However, unlike the embodiment of FIG. 9A, spherical ring 1109 has a lip or base 1121, similar to lip 821 of the embodiment of FIG. 8, which sits on camera body top 835 and so spherical ring 1109 can initially slide over the X-Y plane on top of camera top 835 prior to being permanently affixed. This can be seen more clearly in FIG. 11C which shows an enlarged detailed view of the cut through view of camera body 701 or in FIG. 11D which shows an exploded view.

Figure 11B:
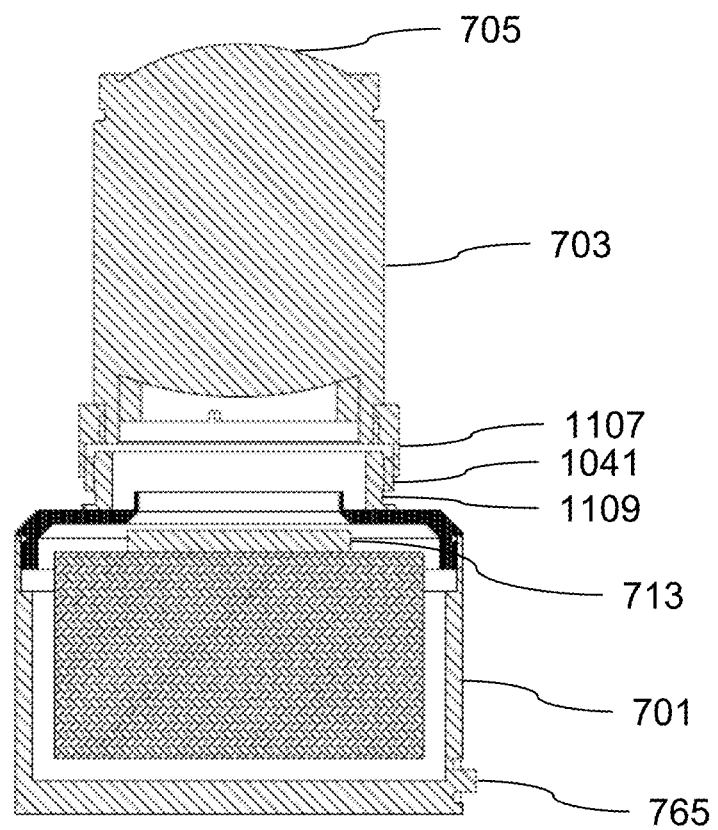
Figure 11C:
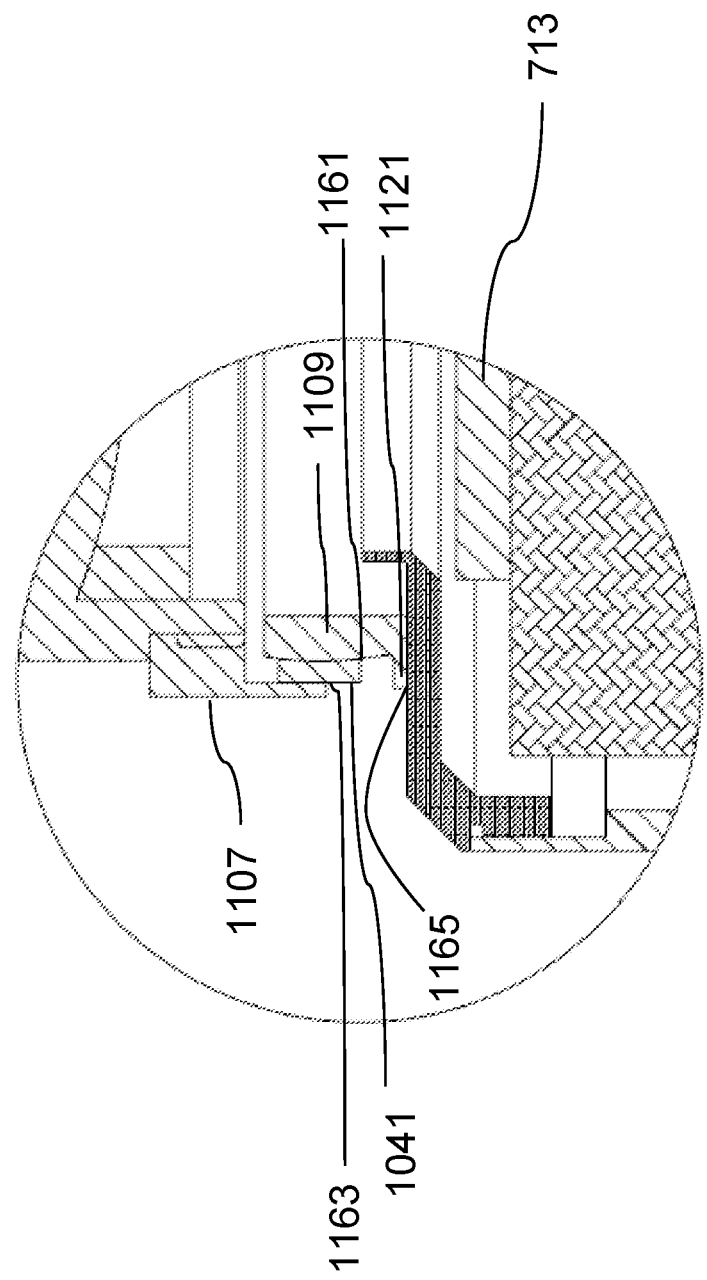
Figure 11D:
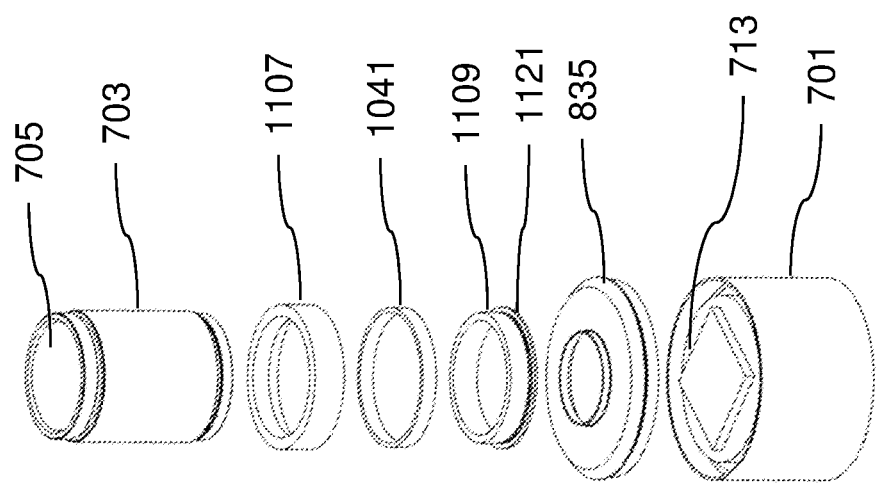

Similar to the embodiment of FIG. 10A, cylindrical-spherical adapter 1041 is interposed between spherical ring 1109 and solid cylindrical ring 1007. As can be seen in FIG. 11B or 11C, the surface of cylindrical-spherical adapter 1041 that mates against spherical ring 1109, i.e., the proximal surface of cylindrical-spherical adapter 1041 with respect to the center of lens body 703, has a spherical shape. This facilitates the tilting of lens body 703 with respect to sensor 713 and camera body 701. The distal surface with respect to the center of lens body 703 of cylindrical-spherical adapter 1041 that mates against solid ring 1107 may be cylindrical in shape to match the shape of solid ring 1107.

Welding may be performed at 1) the exposed interface between spherical ring 1109 and cylindrical-spherical adapter 1041, i.e., the circumference indicated by 1161, 2) the exposed interface between cylindrical-spherical adapter 1041 and solid ring 1107, i.e., the circumference indicated by 1163, and 3) the interface between solid ring 1107 and camera body top 835, i.e., the circumference indicated by 1165. The welding may be performed continuously along each interface, i.e., around the circumference, thus allowing for sealing by welding. In other words, such welding seals the internal area and it also permanently fixes the position of lens body 703 with respect to camera body 701.

If implementing the process of FIG. 6, glue may be placed along a number of points, e.g., 3, around each of the interfaces. If implementing the process of FIG. 6A, a few, e.g., three, spot welds sufficient to maintain the relative positional relationship between the lens body and the camera body without fully welding them may be made, e.g., along the interfaces.

Because welding may be performed through exterior layers, welding may also be performed, or performed instead, anywhere along the interface between spherical ring 1109 and cylindrical-spherical adapter 1041, even where not exposed, and also anywhere along the interface between cylindrical cylindrical-spherical adapter 1041 and solid ring 1107. This is also possible because the interface between spherical ring 1109 and cylindrical-spherical adapter 1041 is spherical, and hence there is no tangent circumference, and similarly, the interface between cylindrical-spherical adapter 1041 and solid ring 1107 is cylindrical, and hence there is no tangent circumference.

Figure 12A:
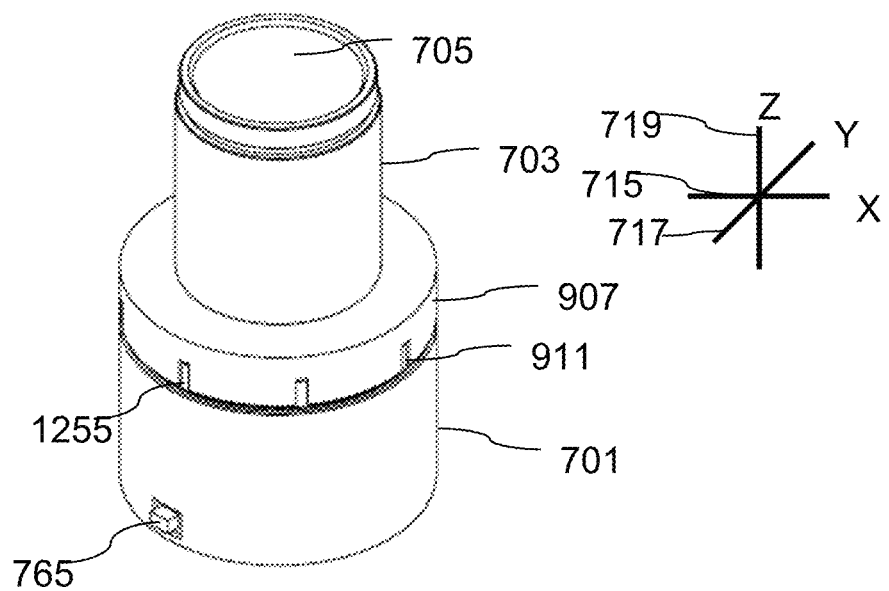

FIG. 12A shows another illustrative embodiment for use with the methods of FIGS. 6 and 6A. This embodiment provides for the same three degrees of freedom of motion for lens body 703 with respect to camera body 701 prior to gluing or welding as provided by the embodiment of FIG. 7A-7D.

Figure 12B:
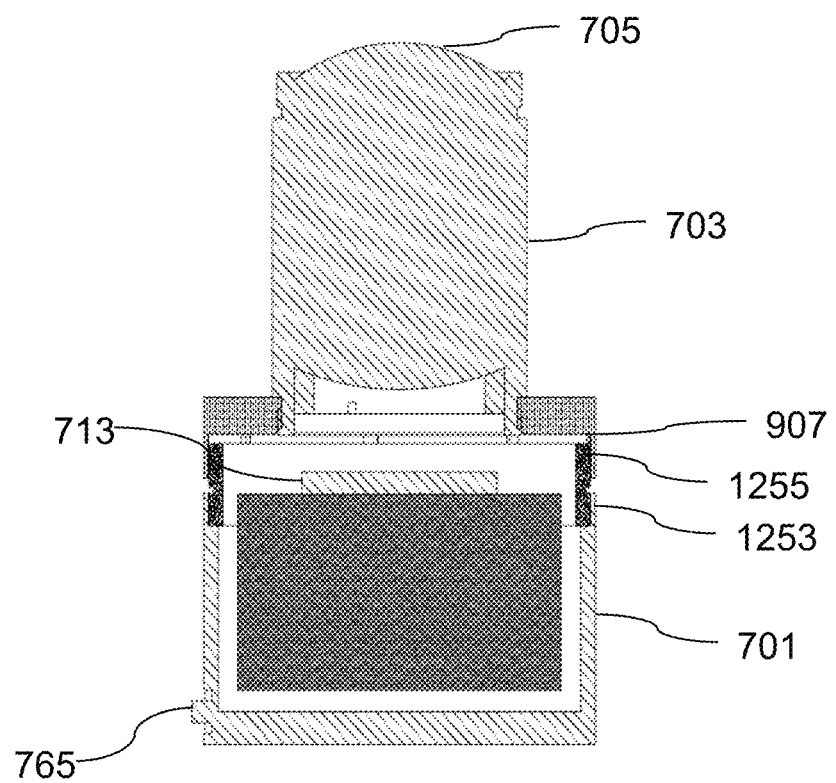
Figure 12D:
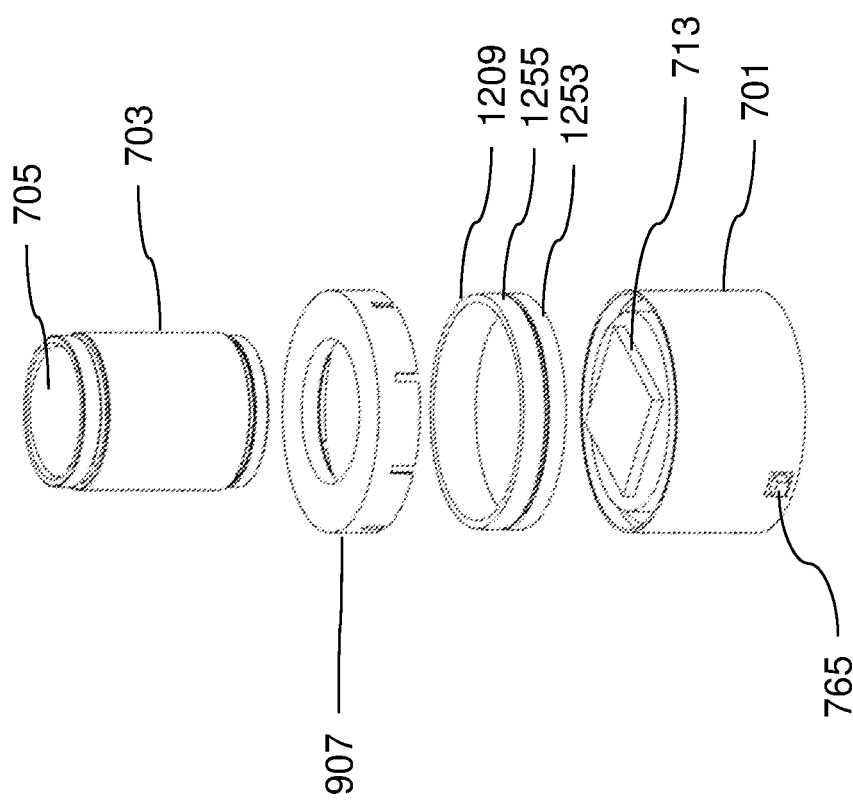

Unlike the embodiment of FIG. 9A a camera body top is not employed. Instead, spherical ring 1209, seen in FIG. 12D, is permanently attached to camera body 701. To this end, spherical ring 1209 may have a lower portion 1253 which is adapted to be affixed within camera body 701, as can be seen in FIGS. 12B-12D, and an upper portion 1255 which has the spherical shape for its distal surface with respect to the center of lens body 703 as explained hereinabove.

Slotted cylindrical ring 907, e.g., as described in connection with FIG. 9A, is permanently attached to lens body 703 using any method available, e.g., glue, welding, friction, or integrated formation, and may be considered as a part of lens body 703 given that such method of attachment is essentially not relevant to the process of FIG. 6 or 6A for placing lens 705 into the ideal lens position and then permanently attaching camera body 701 and lens body 703.

Camera body 701 and lens body 703 are mated by having slotted cylindrical ring 907 be placed over upper portion 1255 of spherical ring 1209. Spherical ring 1209 is thus within slotted cylindrical ring 907 of lens body 703. Spherical ring 1209, and in particular upper portion 1255 thereof, can be seen through slots 911 of slotted cylindrical ring 907 in FIG. 12A. This can be more easily visualized in exploded view 12D. Also, FIG. 12B provides a cross sectional view and FIG. 12C is an enlarged view of the interface between spherical ring 1209 and slotted cylindrical ring 907.

Gluing may be performed within slots 911, as described hereinabove with regard to FIGS. 7A-7D. Welding may be performed along the tangent circumference where there is not glue, as described hereinabove with regard to FIGS. 7A-7D.

Figure 13A:
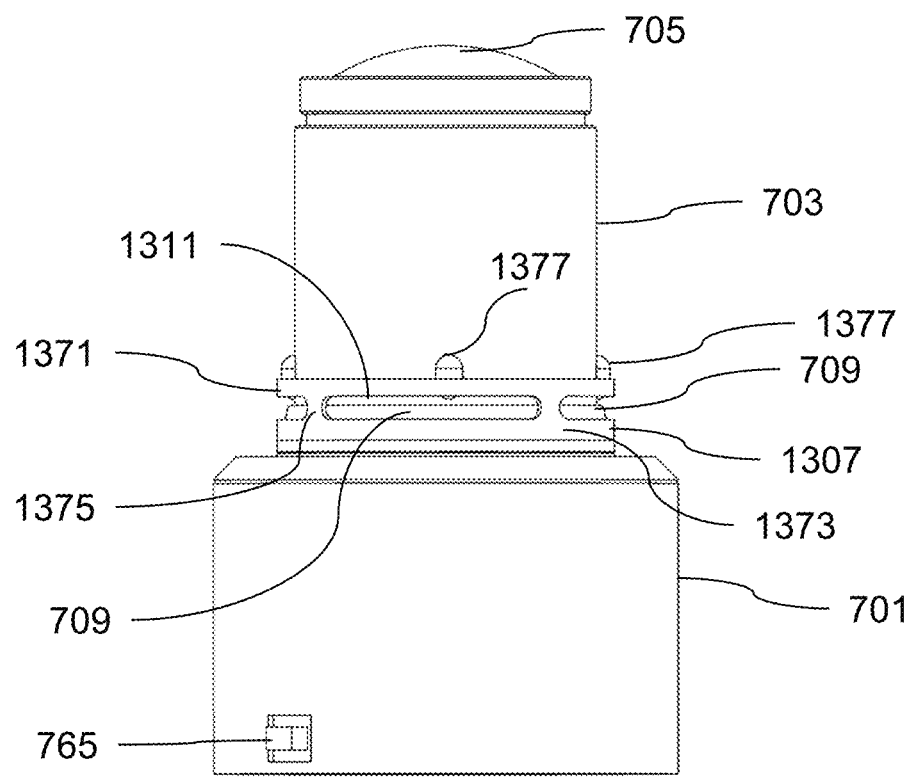
FIGS. 13A-13E shows various views of an illustrative arrangement of an infrared camera having a lens body inserted into a camera body such that they may be permanently joined together in a fixed relationship using welding.

FIG. 13A shows another illustrative embodiment for use with the methods of FIGS. 6 and 6A. This embodiment provides for the same three degrees of freedom of motion for lens body 703 with respect to camera body 701 prior to gluing or welding as provided by the embodiment of FIG. 7A-7D.

Camera body 701 contains slotted cylindrical ring 1307 which receives interior thereto lens body 703. Slotted cylindrical ring 1307 is effectively permanently attached to camera body 701 using any method available, e.g., glue, welding, friction, or integrated formation, and may be considered as a part of camera body 701 given that such method of attachment is essentially not relevant to the process of FIG. 6 or 6A for placing lens 705 into the ideal lens position and then permanently attaching camera body 701 and lens body 703. Slotted cylindrical ring 1307 is different from slotted cylindrical ring 707 in that slotted cylindrical ring 1307 has relatively long slots 1311 that extend horizontally through slotted cylindrical ring 1307. Thus, slotted cylindrical ring 1307 can be thought of as being made up of upper cylindrical ring 1371, lower cylindrical ring 1373, and bridge supports 1375.

In addition, lens body 703 is surrounded by spherical ring 709 which is particularly inserted into cylindrical slotted ring 1307 of camera body 701 and can be seen as well through slots 1311 of slotted cylindrical ring 1307. Spherical ring 709 is effectively permanently attached to lens body 703 using any method available, e.g., glue, welding, friction, or integrated formation, and may be considered as a part of lens body 703 given that such method of attachment is essentially not relevant to the process of FIG. 6 or 6A for placing lens 705 into the ideal lens position and then permanently attaching camera body 701 and lens body 703. This can be more easily seen in exploded view 13E.

Figure 13B:
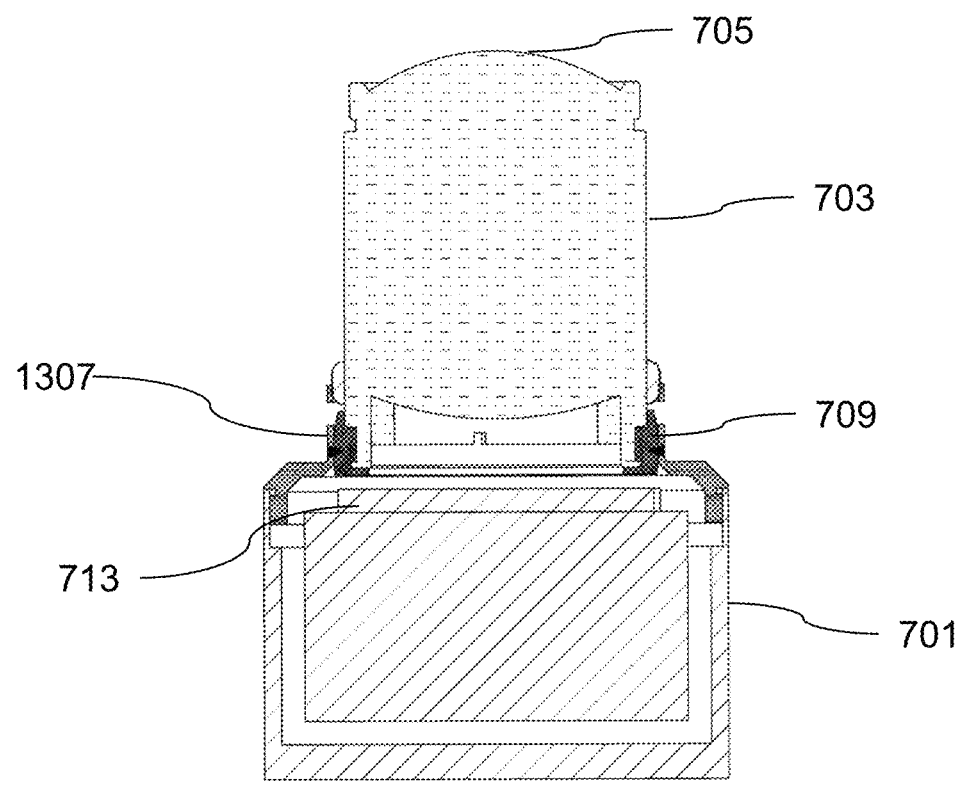
Figure 13C:
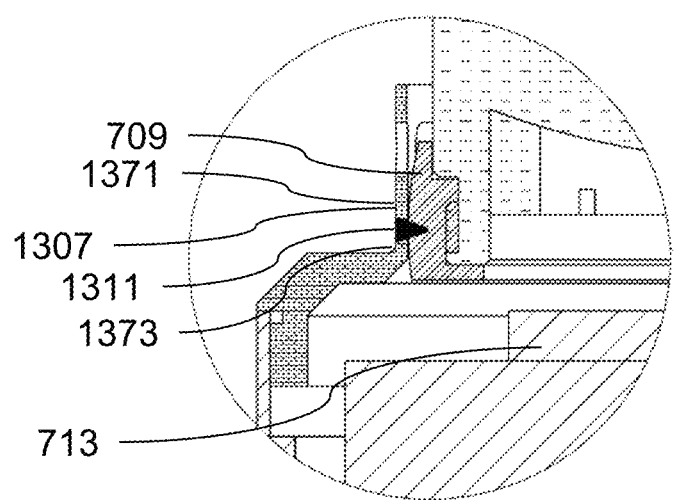

FIG. 13B shows a cut through view of camera body 701 into which has been inserted lens body 703. Also shown in FIG. 13B is sensor 713 for detecting the infrared light. FIG. 13C shows an enlarged detailed view of the cut through view is shown in FIG. 13B.

In order to perform the method of FIG. 6, e.g., step S610 thereof, adhesive dots 1377 are applied to lens housing 703 above the interface with spherical ring 709. When spherical ring 709 and lens body are inserted into camera body 701, by being inserted into cylindrical slotted ring 1307, this is done in a manner such that adhesive dots 1377 make contact with upper cylindrical ring 1371. The calibration is then performed to bring lens 705 into the ideal lens position. Once lens 705 is in the ideal lens position, the adhesive is cured. Once the glue is cured, welding, e.g., per step S640 of the process of FIG. 6, may be performed on the tangent circumference. Because the glue was applied on lens body 703 only above spherical ring 709 and only contacts upper cylindrical ring 1371 of cylindrical ring 1307, and lens body 703 was inserted into camera body 701 such that spherical ring 709 is only in contact with lower cylindrical ring 1373, there is no glue in the vicinity of the tangent circumference. Hence, the welding may be performed continuously along the tangent circumference, i.e., around the entire tangent circumference, thus allowing for sealing by welding. Such welding seals the internal area and permanently fixes the position of lens body 703 with respect to camera body 701.

Figure 13D:
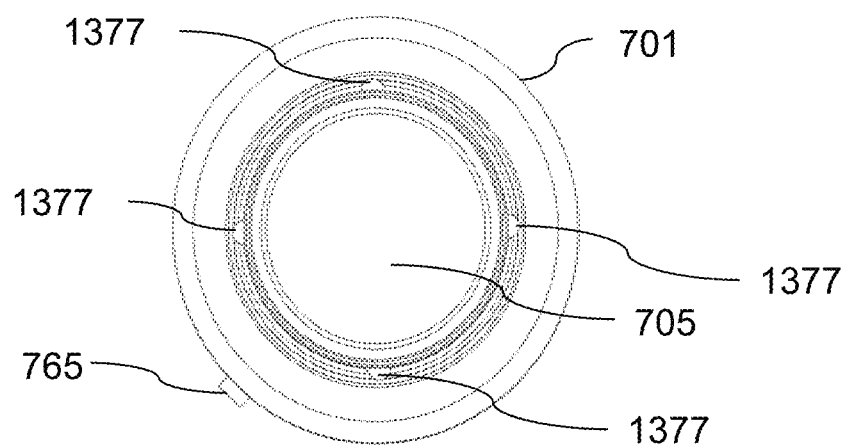
Figure 13E:
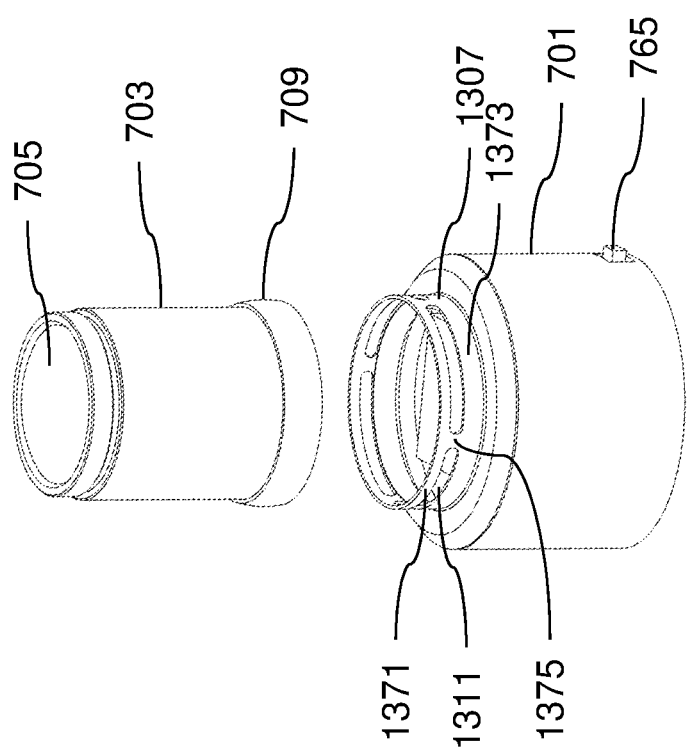

FIG. 13D shows a top view of the embodiment with four illustrative glue dots being visible.

Slots 1311 ease detecting the tangent circumference by providing visual or sensory access to at least part of spherical ring 709. As noted above, in one embodiment computer vision may be employed to detect the tangent circumference. In another embodiment of the invention, triangulation, e.g., using one or more distance sensors, is employed to detect the tangent circumference. Knowing where the tangent circumference is enables the welding to be performed along it.

Figure 14:
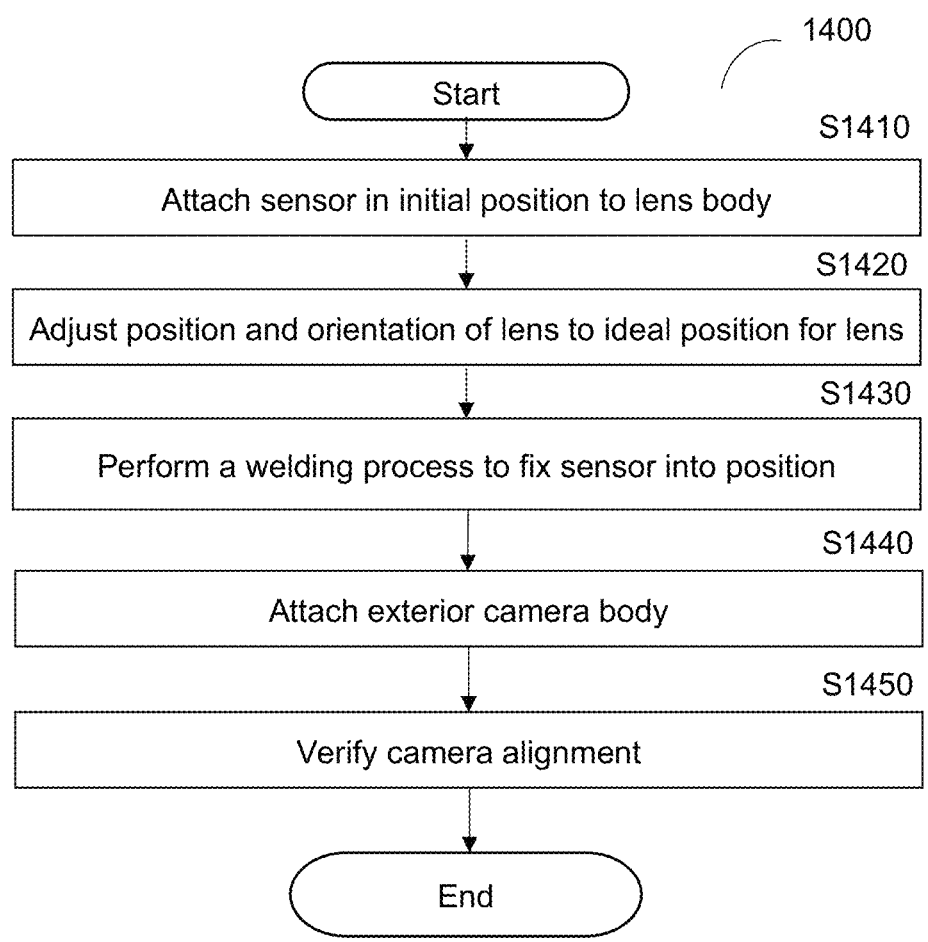
FIG. 14 shows a flow chart for an illustrative process by which a sensor is adjusted with respect to a lens in order to place the lens in the ideal lens position.

FIG. 14 shows a flow chart for an illustrative process by which the sensor is adjusted with respect to the lens, thus rendering the lens in the ideal lens position, instead of moving the lens body, the camera body, or both with respect to the other. With regard to the embodiments described above, this may be achieved by holding lens body 703 fixed and moving camera body 701 with a robot arm, e.g., one coupled to a hexapod.

In some embodiments, when performing the process of FIG. 14, the camera body housing is not initially affixed to contain the sensor and other electronics but rather is later affixed. This way, internal components can be manipulated, e.g., by a robotic arm, to adjust the position of the sensor.

The process is entered in step 1400. In step S1410, the sensor is attached to the lens body, the sensor being in an initial position. In step S1420, the position and orientation of the lens is adjusted so as to effectively bring the lens into the ideal lens position with respect to the adjusted position of the sensor. This may be performed by a robot arm under computer control using feedback from the sensor. In step S1420, the ideal lens position is determined to be reach in a manner similar to that described above, for example, based on calibration target images and MTF charts associated with those targets, e.g., as discussed in connection with FIG. 3.

Once the lens is in the ideal lens position with respect to the sensor, a welding process is performed in step S1430 to fix the sensor at its position. In an embodiment, the welding process is performed by a welding unit that is computer controlled, i.e., controlled by software executing on a computer, or hardware, that is configured to control the operation of the welding unit. Thereafter, in step S1440, the exterior camera body is attached to complete the camera. The camera alignment may be verified in optional step S1450. In an embodiment, optional step S1450 may be performed before step S1440.

Figure 15:
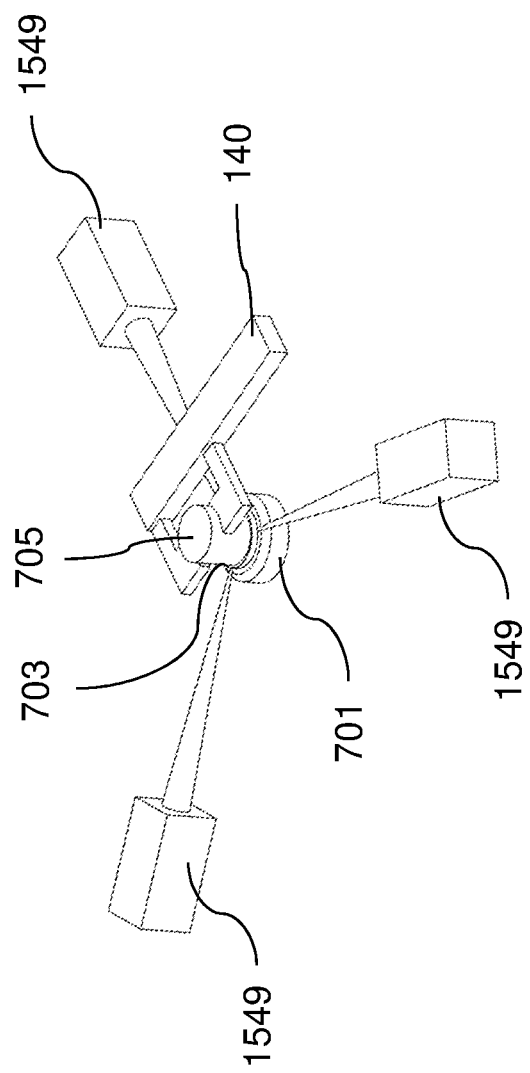
FIG. 15 shows a robotic arm holding a lens body and illustrative welders.

FIG. 15 shows robotic arm 140 holding lens body 703. Also shown are illustrative welders 1549, e.g., laser welders. Although three laser welders 1549 are shown, any number may be used. In one embodiment, laser welders are maintained in a fixed position. In one embodiment, one or more of laser welders 1549 may be used to perform spot welding to keep lens body 703 and camera body 701 positioned so that lens 705 is in the ideal lens position. In one embodiment, one or more of laser welders may perform the entire welding process, e.g., as called for in step S640 of FIG. 6 or step S640A of FIG. 6A. To that end, camera body 701 and lens body 703 may be moved, e.g., rotated. In one embodiment, one or more of laser welders 1549 may be used to perform a welding process to fix the infrared sensor into position, e.g., as called for in step S1430 (FIG. 14).

Figure 16:
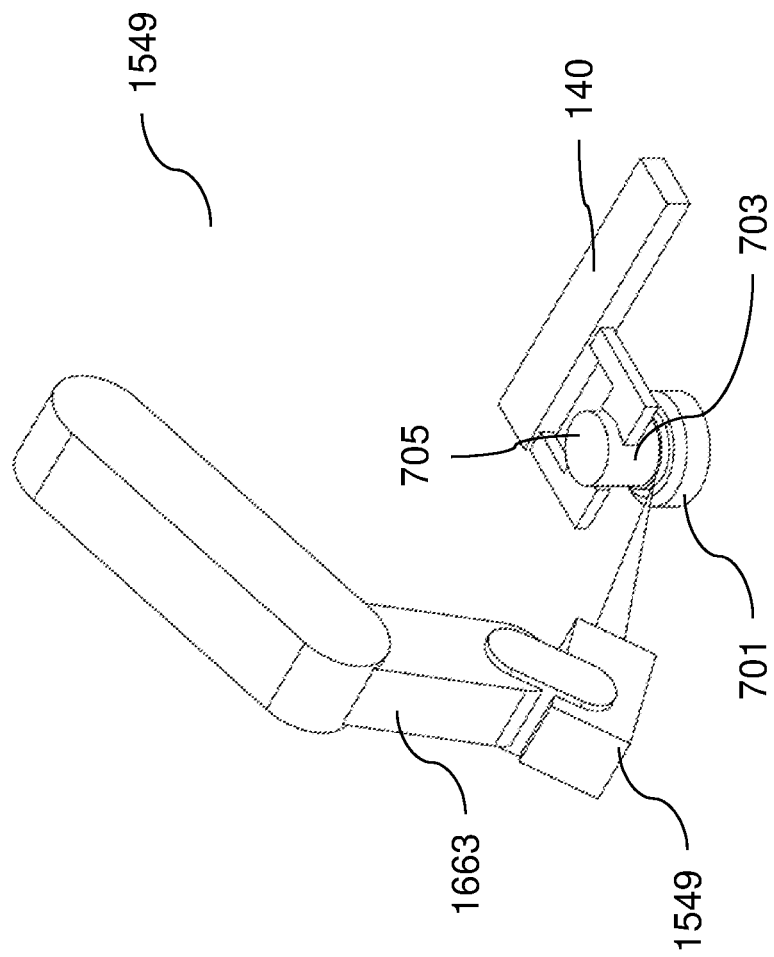
FIG. 16 shows robotic arm holding a lens body and a welder attached to robotic arm.

FIG. 16 shows robotic arm 140 holding lens body 703. Also shown is illustrative welder 1549. Welder 1549 is attached to robotic arm 1663 which is used to move welder 1549 with respect to camera body 701 and lens body 703. In one embodiment, laser welder 1549 may be used to perform spot welding to keep lens body 703 and camera body 701 positioned so that lens 705 is in the ideal lens position. In one embodiment, laser welder may perform the entire welding process, e.g., as called for in step S640 of FIG. 6 or step S640A of FIG. 6A. To that end, in addition to welder 1549 being moved by robotic arm 1663, camera body 701 and lens body 703 may be moved, e.g., rotated. In one embodiment, laser welder 1549 may be used to perform a welding process to fix the infrared sensor into position, e.g., as called for in step S1430 (FIG. 14). Although only a single robotic arm 1663 and a single laser welder 1549 is shown, any number of robotic arms and laser welders may be employed.

Figure 17A:
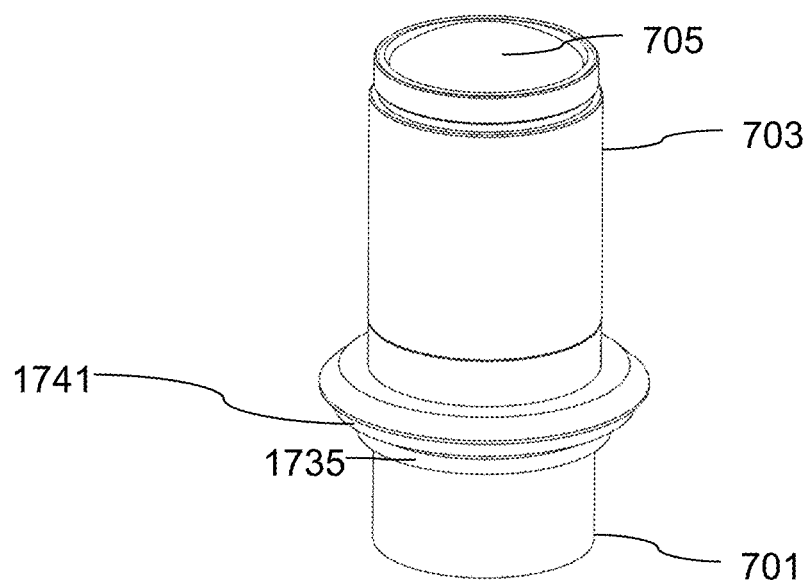

FIG. 17A shows another illustrative embodiment for use with the method of FIG. 14, and particular, for holding lens body 703 fixed and moving sensor 713. This embodiment provides for five degrees of freedom of motion for sensor 713 with respect to lens body 703, and hence lens 705, prior to welding. These include the same three degrees provided by the embodiment of FIG. 7A-7D along with planar motion, i.e., motion in the X direction and the Y direction which together form the X-Y plane which is the plane of sensor 713.

As can be better seen in the exploded view shown in FIG. 17C, sensor 713 is attached to sensor mount disk 1769 which may be made of any material suitable for welding. Sensor 713 is attached to sensor mount disk 1769 using any method available, e.g., glue or one or more fasteners, and sensor mount disk 1769 may be considered as a part of sensor 713, e.g., a later affixed base thereof, given that such method of attachment is essentially not relevant to the process of fixing the position of sensor 713. Sensor mount disk 1769 is employed because direct welding of sensor 713 is often not possible or not recommended. In the event that sensor 713 is constructed in a manner that it may be directly welded, then sensor mount disk 1769 need not be employed. Sensor mount disk 1769 is positioned on the surface of slotted disk 1735. Sensor mount disk 1769 may be moved in the X-Y plane, thus correspondingly moving sensor 713. Outer surface or rim 1709 of slotted disk 1735 has a spherical shape. Outer surface 1709 of slotted disk 1735 is thicker than the disk itself so that it at least extends somewhat upwardly so as to contain movement in the X-Y plane of sensor mount disk 1769.

Slotted disk 1735 has slot 1787, through which is fed cable 1785 which carries signals to and from sensor 713. Slotted disk 1735 also has slots 1789 through which fingers or jaws 1793 of robot arm gripper 1791, which is in turn coupled to a robot arm, may be inserted. Although three slots 1789 and three fingers 1793 are shown, such is for illustrative purposes only as different numbers of fingers and slots may be employed. Typically the number of fingers 1793 and slots 1789 would match, however that is not required. Fingers 1793 of the robot arm are further adapted so as to grip and move sensor mount disk 1769 and hence sensor 713 in the X-Y plane along the surface of slotted ring 1735. Robot arm gripper 1791 is further adapted so as to tilt the surface of slotted disk 1735 and hence both of sensor mount disk 1769 and sensor 713 which rest thereon. In addition, robot arm gripper 1791 is further adapted so as to move the surface of slotted disk 1735, and hence sensor mount disk 1769 and sensor 713, with translation along the Z-axis. Thus, robot arm gripper 1791 and its fingers 1793 can cause sensor 713 to be moved with respect to lens 705 within lens body 703 until, effectively, lens 705 is in the ideal lens position with respect to sensor 713.

Inner surface 1799 of cylindrical-spherical adapter 1741, which mates against outer surface 1709 of slotted disk 1735, i.e., the proximal surface of cylindrical-spherical adapter 1741 with respect to the center of lens body 703, has a spherical shape. This facilitates the tilting of slotted ring 1735 with respect to lens 705 and lens body 703. Outer surface 1707 of slotted disk 1735, i.e., the distal surface with respect to the center of lens body 703 of cylindrical-spherical adapter 1741, is cylindrical in shape.

Lens body 703 surrounds cylindrical-spherical adapter 1741.

Gripper 1797 holds lens body 703, and hence lens 705, in a fixed position while robot arm gripper 1791 and its fingers 1793 move sensor 703. Also shown is piston 1795 which exerts a force perpendicular to the slotted disk 1735, sensor mount disk 1769, and sensor 713, e.g., to hold the parts together until they are welded.

Figure 17B:
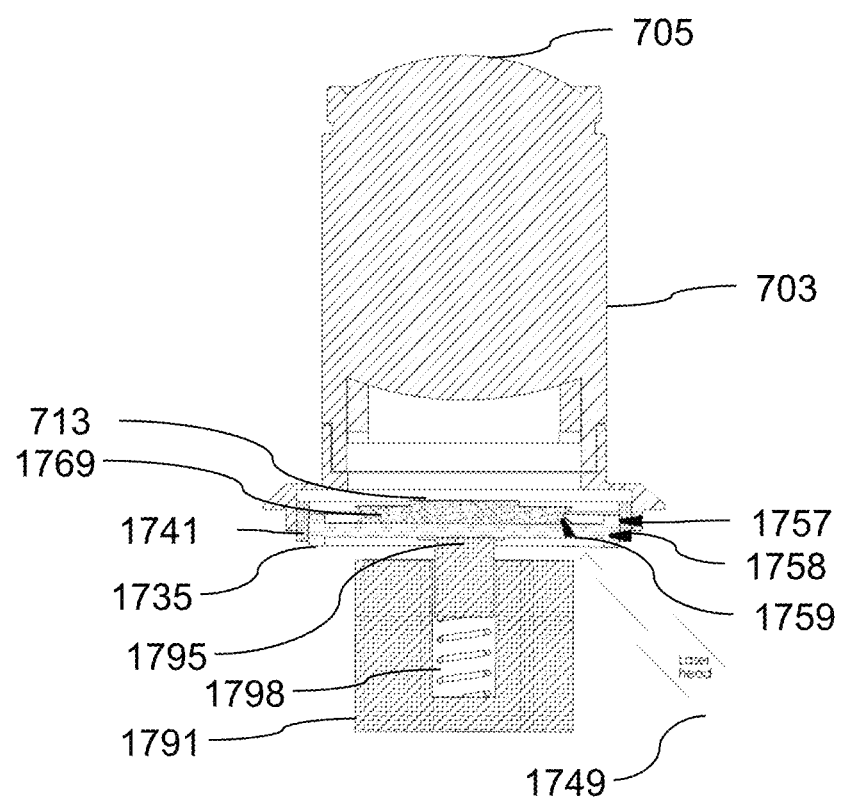
Figure 17D:
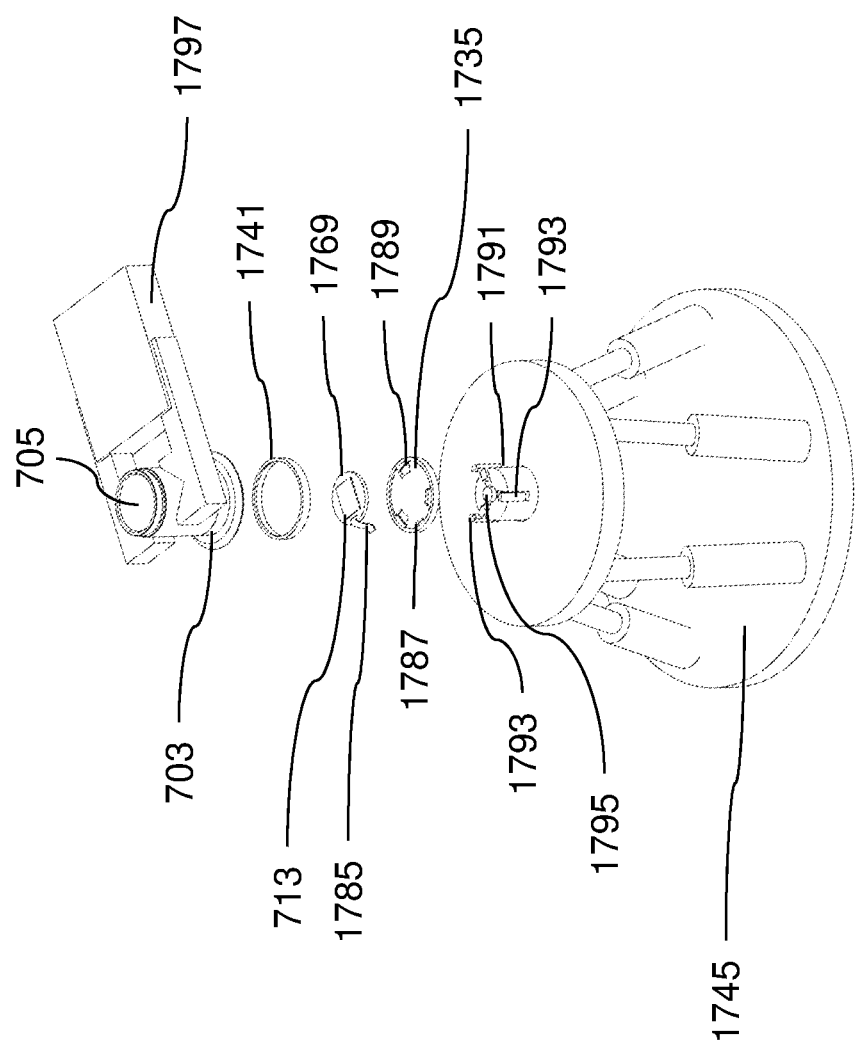

FIG. 17D shows a further exploded view similar to FIG. 17C of an embodiment in robot arm gripper 1791 is mounted on computer-controlled hexapod 1745 which controls the movement of robot gripper 1791 and provides for movement of robot gripper 1791 in all of the directions necessary to provide for the degrees of freedom for this embodiment. Thus, robot gripper 1791, its fingers 1793, piston 1795, and hexapod 1745 act as a robotic arm to move and thereby adjust the position of sensor 713 with respect to lens 705.

In other embodiments, other types of manipulators may be employed, e.g., in lieu of hexapod 1745 and or in lieu of robot gripper 1791.

Welding may be performed, as shown in the cross section of FIG. 17B at 1) at points on the interface between lens body 703 and cylindrical-spherical adapter 1741, i.e., points on the circumference indicated by 1757, 2) at points on the interface between slotted disk 1735 and cylindrical-spherical adapter 1741, i.e., points on the circumference indicated by 1758, and 3) the interface between sensor mount disk 1769 and slotted disk 1735, i.e., the circumference indicated by 1759. The welding may be performed by laser welder 1749. Because these welds are internal to the camera as a whole, the bonding they provide need not be as strong as in some other embodiments. Therefore, point welding may be sufficient. In one illustrative embodiment, three weld points are employed. However, other numbers of welding points may be employed and, where possible, the welding may be performed continuously along an interface, i.e., around the circumference.

FIG. 17B also shows spring 1798 employed with piston 1795, e.g., to keep piston 1795 deployed.

FIG. 17E shows another slightly less exploded view than in FIG. 17D where it can be seen that fingers 1791 extend through slots 1789 of slotted disk 1735 to grab sensor mount disk 1769 which is thereon. It can also be seen that cable 1785 extends through slot 1787.

Figure 17F:
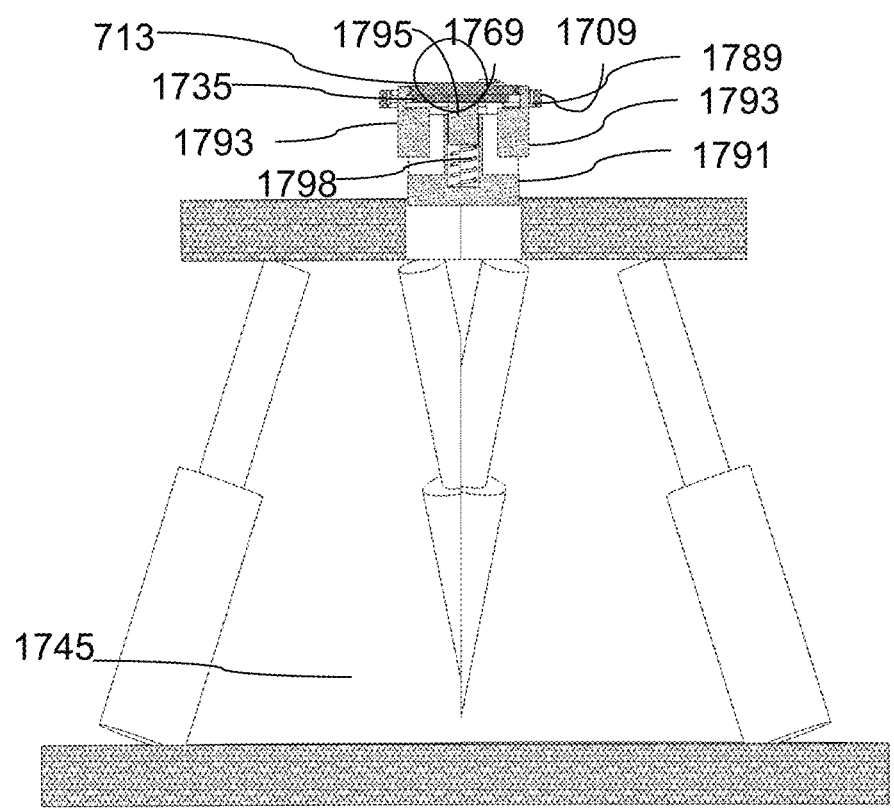

FIG. 17F shows an enlarged cross section of slotted disk 1735 having mounted thereon sensor mount disk 1769 and in turn sensor 713. Fingers 1793 of robot arm gripper 1791 can be seen inserted through slots 1789 to grab sensor mount disk 1769 and thus effectively sensor 713. Thus, in total, the combined robot arm can position sensor 713 relative to lens 705 with five degrees of freedom.

After welding, exterior camera body 701 may be attached to lens body 703. Advantageously, since all of the welding is performed internal to the attached camera body, the camera body and lens body may be completely sealed. In one embodiment, this is achieved by screw together mating between camera body 701 and lens body 703, which, advantageously, provides for effective, easy to implement, and inexpensive attachment.

Note that not all components are visible in each cross section because of the plane in which the cross section is taken.

It will be appreciated by those of ordinary skill in the art that in many of the embodiments disclosed herein an additional degree of freedom, namely, rotation about the Z-axis is possible. However, such rotation has no effect on the ideal lens position, and as such may be, effectively, ignored.

The foregoing may be similarly applied to use with non-infrared cameras.

Portions of the various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Unless otherwise explicitly specified herein, any lens shown and/or described herein may actually be implemented as an optical system having the particular specified properties of that lens. Such an optical system may be implemented by a single lens element but is not necessarily limited thereto. This is because, as is well known in the art, various optical systems may provide the same functionality of a single lens element but in a superior way, e.g., with less distortion. Also, unless otherwise explicitly specified here, all optical elements or systems that are capable of providing specific function within an overall embodiment disclosed herein are equivalent to one another for purposes of the present disclosure.

What is claimed is:

1. A system for securing an infrared camera lens in optical alignment with an infrared camera sensor, comprising:
   a computer-controlled robotic arm configured to adjust a relative position of the infrared camera sensor and the infrared camera lens so as to bring the infrared lens into an ideal lens position with respect to the infrared camera sensor, wherein the adjusting of the relative position is not restricted to be within a two-dimensional plane; and
   at least one computer-controlled welder, the at least one computer-controlled welder being configured to perform welding together of at least two parts of the infrared camera after the infrared camera lens is positioned by the robotic arm in the ideal lens position with respect to the infrared camera sensor such that the infrared camera lens is permanently maintained in the ideal lens position.

2. The system of claim 1, wherein the adjusting is performed by moving a lens body comprised of metal and containing the infrared camera lens with respect to a camera body comprised of metal and containing the infrared camera sensor, the metal of the lens body and the metal of the camera body are at least two of the at least two parts to be welded together by the computer-controlled welder.

3. The system of claim 1, wherein the adjusting is performed by moving the infrared camera sensor with respect to the infrared camera lens, the infrared camera lens being contained within a lens body.

4. The system of claim 1, wherein the ideal lens position is determined based on infrared rays output by at least one collimator that is positioned such that the output infrared rays converge on the infrared camera sensor through the infrared camera lens.

5. The system of claim 1, wherein, after being brought into the ideal lens position by the robotic arm and prior to welding, the infrared camera is maintained in the ideal lens position by an adhesive that was applied to at least one of a camera body containing the infrared sensor and a lens body containing the infrared camera lens.

6. The system of claim 1, wherein the ideal lens position is determined based on infrared rays output by at least one collimator that is positioned such that the output infrared rays converge on the infrared camera sensor after passing through the infrared camera lens; and wherein the at least one collimator includes a black body configured as a calibration target for the infrared camera lens.

7. The system of claim 5, wherein the robotic arm is further configured to adjust the position of the infrared camera lens based on a modulation transfer function (MTF) chart associated with the calibration target.

8. The system of claim 1, wherein prior to welding but after being placed in the ideal lens position the infrared camera lens is kept from moving from the ideal lens position at least in a Z direction at least by friction.

9. The system of claim 1, wherein the at least one computer-controlled welder is located separately from the robotic arm, and wherein the infrared camera lens and the infrared camera sensor are moved together with the infrared camera lens in the ideal lens position from a location of the robotic arm to a location of the at least one computer-controlled welder.

10. The system of claim 1, wherein at least one of the at least one computer-controlled welder is a laser welder.

11. The method of claim 1, wherein the at least one computer-controlled welder performs the welding on at least a portion of tangent circumference at an interface of a spherical shaped ring that is within a cylindrical shaped ring, at least one of the spherical shaped ring and the cylindrical shaped ring being associated with a camera body and the other of the at least one of the spherical shaped ring and the cylindrical shaped ring being associated with a lens body containing the infrared camera lens.

12. The system of claim 1, wherein after being placed in the ideal lens position the infrared camera lens is kept in the ideal lens position by the at least one computer-controlled welder first performing a plurality of spot welds as part of the welding.

13. The system of claim 1, wherein at least one of the at least one computer-controlled welder is mounted on a computer-controlled robotic arm.

14. A method for securing an infrared camera lens in optical alignment with an infrared camera sensor, comprising:
   adjusting a relative position of the infrared camera sensor and the infrared camera lens such that the infrared camera lens is in an ideal lens position with respect to the infrared camera sensor, wherein the adjusting of the relative position is not restricted to be within a two-dimensional plane; and
   performing welding, by at least one computer-controlled welder, such that the infrared camera lens is permanently maintained in the ideal lens position with respect to the infrared camera sensor.

15. The method of claim 14, wherein the adjusting is performed by a robotic arm.

16. The method of claim 14, wherein the welding welds together at least metal of two parts of the infrared camera.

17. The method of claim 14, wherein the adjusting is performed by moving a lens body comprised of metal and containing the infrared camera lens with respect to a camera body comprised of metal and containing the infrared camera sensor, the metal of the lens body and the metal of the camera body are at least two of the at least two parts to be welded together by the computer-controlled welder.

18. The method of claim 14, wherein the adjusting is performed by moving the infrared camera sensor with respect to the infrared camera lens, the infrared camera lens being contained within a lens body.

19. The method of claim 14, wherein the ideal lens position is determined based on infrared rays output by at least one collimator that is positioned such that the output infrared rays converge on the infrared camera sensor through the infrared camera lens.

20. The method of claim 14, further comprising applying adhesive to at least one of a camera body containing the infrared sensor and a lens body containing the infrared camera lens, the adhesive helping to maintain the lens is in the ideal lens position after it is brought into the ideal lens position.

21. The method of claim 14, wherein the ideal lens position is determined based on infrared rays output by at least one collimator that is positioned such that the output infrared rays converge on the infrared camera sensor after passing through the infrared camera lens; and wherein the at least one collimator includes a black body configured as a calibration target for the infrared camera lens.

22. The method of claim 21, wherein adjustment of the relative position of the infrared camera sensor and the infrared camera lens is based on a modulation transfer function (MTF) chart associated with the calibration target.

23. The method of claim 14, wherein prior to welding but after being placed in the ideal lens position the infrared camera lens is kept from moving from in the ideal lens position at least in a Z direction at least by friction.

24. The method of claim 14, wherein the infrared camera lens and the infrared camera sensor are moved together with the infrared camera lens in the ideal lens position from a location at which the adjusting was performed to a location of the at least one computer-controlled welder.

25. The method of claim 14, wherein at least one of the at least one computer-controlled welder is a laser welder.

26. The method of claim 14, wherein the at least one computer-controlled welder performs the welding on at least a portion of tangent circumference at an interface of a spherical shaped ring that is within a cylindrical shaped ring, at least one of the spherical shaped ring and the cylindrical shaped ring being associated with a camera body and the other of the at least one of the spherical shaped ring and the cylindrical shaped ring being associated with a lens body containing the infrared camera lens.

27. The method of claim 14, wherein after being placed in the ideal lens position the infrared camera lens is kept in the ideal lens position by the at least one computer-controlled welder first performing a plurality of spot welds as part of the welding.

28. The method of claim 14, wherein at least one of the at least one computer-controlled welder is mounted on a computer-controlled robotic arm.

29. A method for securing a camera lens in optical alignment with a camera sensor, comprising:
adjusting a relative position of the camera sensor and the camera lens such that the camera lens is in an ideal lens position with respect to the camera sensor, wherein the adjusting of the relative position is not restricted to be within a two-dimensional plane; and
performing welding, by at least one computer-controlled welder, such that the camera lens is permanently maintained in the ideal lens position with respect to the camera sensor.

* * * * *